United States Patent
Bender

(10) Patent No.: US 6,850,494 B1
(45) Date of Patent: *Feb. 1, 2005

(54) METHOD AND SYSTEM FOR QUERYING ATTRIBUTES IN A CELLULAR COMMUNICATIONS SYSTEM

(75) Inventor: Paul E. Bender, San Diego, CA (US)

(73) Assignee: Qualcomm Incorporated, San Diego, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/480,710

(22) Filed: Jan. 7, 2000

Related U.S. Application Data

(63) Continuation-in-part of application No. 09/406,452, filed on Sep. 27, 1999.
(60) Provisional application No. 60/163,327, filed on Nov. 3, 1999.

(51) Int. Cl.[7] .............................................. H04L 12/28
(52) U.S. Cl. ..................................... 370/254; 370/331
(58) Field of Search ................................ 370/254, 313, 370/338, 410, 422, 400, 331; 340/825.44; 455/39, 433–453, 429, 426, 458, 524

(56) References Cited

U.S. PATENT DOCUMENTS

| | | | | |
|---|---|---|---|---|
| 4,864,559 A | * | 9/1989 | Perlman ..................... 370/256 |
| 5,625,876 A | | 4/1997 | Gilhousen et al. ......... 455/33.3 |
| 5,737,707 A | * | 4/1998 | Gaulke et al. .............. 455/556 |
| 5,802,454 A | * | 9/1998 | Goshay et al. ............. 455/31.2 |
| 5,889,770 A | | 3/1999 | Jokiaho et al. ............. 370/337 |
| 5,892,916 A | | 4/1999 | Gehlhaar et al. |
| 5,953,320 A | * | 9/1999 | Williamson et al. ........ 370/252 |
| 5,953,667 A | * | 9/1999 | Kauppi ........................ 455/440 |
| 6,073,165 A | * | 6/2000 | Narasimhan et al. ....... 709/206 |
| 6,138,025 A | * | 10/2000 | Lee et al. .................... 455/453 |
| 6,161,185 A | * | 12/2000 | Guthrie et al. .............. 713/201 |
| 6,167,268 A | * | 12/2000 | Souissi et al. .............. 455/434 |
| 6,181,933 B1 | * | 1/2001 | Jeong ...................... 455/432.1 |
| 6,201,965 B1 | * | 3/2001 | Mizell et al. ............... 455/433 |
| 6,201,969 B1 | * | 3/2001 | Meier ......................... 455/442 |
| 6,236,365 B1 | * | 5/2001 | LeBlanc et al. ............ 342/457 |
| 6,400,950 B1 | * | 6/2002 | Patel et al. .................. 455/433 |
| 6,408,182 B1 | * | 6/2002 | Davidson et al. .......... 455/424 |
| 6,424,638 B1 | * | 7/2002 | Ray et al. ................... 455/510 |
| 6,539,230 B2 | * | 3/2003 | Yen ......................... 455/456.1 |

OTHER PUBLICATIONS

Wang, J.Z. A fully distributed location registration strategy for universal personal communication systems; Selected Areas in Communications, IEEE Journal on , vol. 11, Aug. 1993, 850–860.*

Ito, S. Decentralized location registration information storage method for multimedia services in mobile communication networks; Universal Personal Communications. Fourth IEEE International Conference on , 1995 263–267.*

Fielding, et al. Hypertext Transfer Protocol "HTTP/1.1", pp. 1–6, 30–34, 152–154 (Jan. 1997).

* cited by examiner

*Primary Examiner*—Chi Pham
*Assistant Examiner*—Keith M. George
(74) *Attorney, Agent, or Firm*—Phil Wadsworth; Thomas R. Rouse; Sandra L. Godsey

(57) ABSTRACT

In communications networks, network elements require knowledge of other network elements such as when they are added to or deleted from the network configuration and the resources they have available. The protocol allows network elements to communicate resource information dynamically and directly. The protocol also allows direct exchange of network configuration information between network elements for determining wireless communications network paging areas.

12 Claims, 18 Drawing Sheets

DISTRIBUTED MPT AN

DISTRIBUTED
NAS

DISTRIBUTED MPC

METHOD AND SYSTEM FOR QUERYING ATTRIBUTES IN A CELLULAR COMMUNICATIONS SYSTEM

CLAIM OF PRIORITY UNDER 35 U.S.C. §120

The present application is a continuing application of Provisional Application Ser. No. 60/163,327, filed Nov. 3, 1999 which is a continuation-in-part application of co-pending U.S. patent application Ser. No. 09/406,452, filed Sep. 27, 1999, entitled "METHOD AND SYSTEM FOR QUERYING ATTRIBUTES IN A CELLULAR COMMUNICATIONS SYSTEM".

BACKGROUND OF THE INVENTION

I. Field of the Invention

The present invention relates to wireless network communications. More specifically, the present invention relates to a novel and improved protocol by which wireless network elements can communicate.

II. Background

In communications networks many functions performed by individual network elements require knowledge of information from surrounding network elements. Although other techniques such as propagating required information individually to each network element from a central control element are known, the present invention has significant advantages over these other techniques. Attempting to propagate information from a central control element to multiple network elements is time consuming and error prone. In addition, some attributes (such as resource availability) change frequently.

In a CDMA communications system, many functions performed by the network elements require information from surrounding network elements. In the present invention, the protocol is described in terms of information propagation between network elements comprising Modem Pool Transceivers and Modem Pool Controllers (MPCsl. A Modem Pool Transceiver (MPT) is a communications network element which performs modulation and demodulation of radio frequency network traffic, and is also responsible for scheduling, power control, and overhead message handling tasks. An MPC is another element which provides radio control and signaling services to the MPT elements that include power control synchronization, maintaining modem session state, and network connection control. MPCs generate and process data for the MPTs to transmit and receive. MPTs need air interface attributes of neighboring MPTs in order to construct the correct air interface overhead messages. MPCs need air interface attributes of MPTs in order to perform MPT handoff. MPCs need air interface attributes of MPTs in order to perform Access Terminal paging. An Access Terminal (AT) is a device with a modem, and a data interface that allows the user to access an IP network through an Access Network (AN). MPCs need resource availability attributes of surrounding MPCs in order to perform MPC handoff.

Presently, there is no ideal method for satisfying the needs of wireless communications network elements to directly exchange information.

One problem that arises when network elements cannot directly exchange information is that MPCs do not have an expedient method for discovering information about surrounding MPTs necessary to perform AT Paging. At any given time, an MPC may be responsible for paging one or more dormant ATs.

"Dormant" refers to the period of time when an AT and an AN have an established session, but do not have an established connection. Dormant mode allows the AT to maintain the "always on" state while using only limited radio link capacity and limited AT power when sending or receiving data.

In order to deliver data to a dormant AT, the MPC must be able to locate the AT. The MPC locates the dormant AT by paging the dormant AT in all the MPTs in which the dormant AT might be located. This collection of MPTs is referred to as the paging area. In order to page the dormant AT, the MPC must know the paging area.

Currently, there is no ideal method for satisfying the needs of MPCs to dynamically discover paging area information needed for AT Paging.

SUMMARY OF THE INVENTION

The present invention is a novel and improved protocol for directly updating attribute information in communications networks.

The present invention provides a generic protocol based on the HyperText Transfer Protocol version 1.1 (HTTP/1.1) and Multipurpose Internet Mail Extensions (MIME), which allows individual network elements to query other network elements directly for information without network manager intervention. It greatly reduces system failures caused by propagation errors and stale information, as well as, facilitating additional network element deployment and network element removal.

The network elements make their attributes available through the use of HTTP/1.1. Other network elements are able to query for specific attributes using the HTTP GET method. The response is a return HTTP header with a MIME part body containing a list of the attribute name/value pairs.

The present invention provides a generic protocol for allowing communication network elements to query other network elements for information. It allows network information to be configured in one location and queried dynamically by other locations. It prevents propagation errors and outdated information errors introduced by propagating required information individually to each network element through network management interfaces by a centralized network manager.

Embodiments of the present invention also meet paging information discovery needs by providing a protocol for allowing an MPC to dynamically query information needed for AT Paging from MPTS. The present invention provides a method for determining cellular paging areas of a wireless communication network by exchanging network configuration information directly between network elements, and determining access terminal paging areas from the exchanged network configuration information.

BRIEF DESCRIPTION OF THE DRAWINGS

The features and advantages of the present invention will become more apparent from the detailed description set forth below when taken in conjunction with the drawings in which like reference characters correspond throughout and wherein.

DETAILED DESCRIPTION OF THE PREFERRED EMBODIMENTS

Figure 2A:
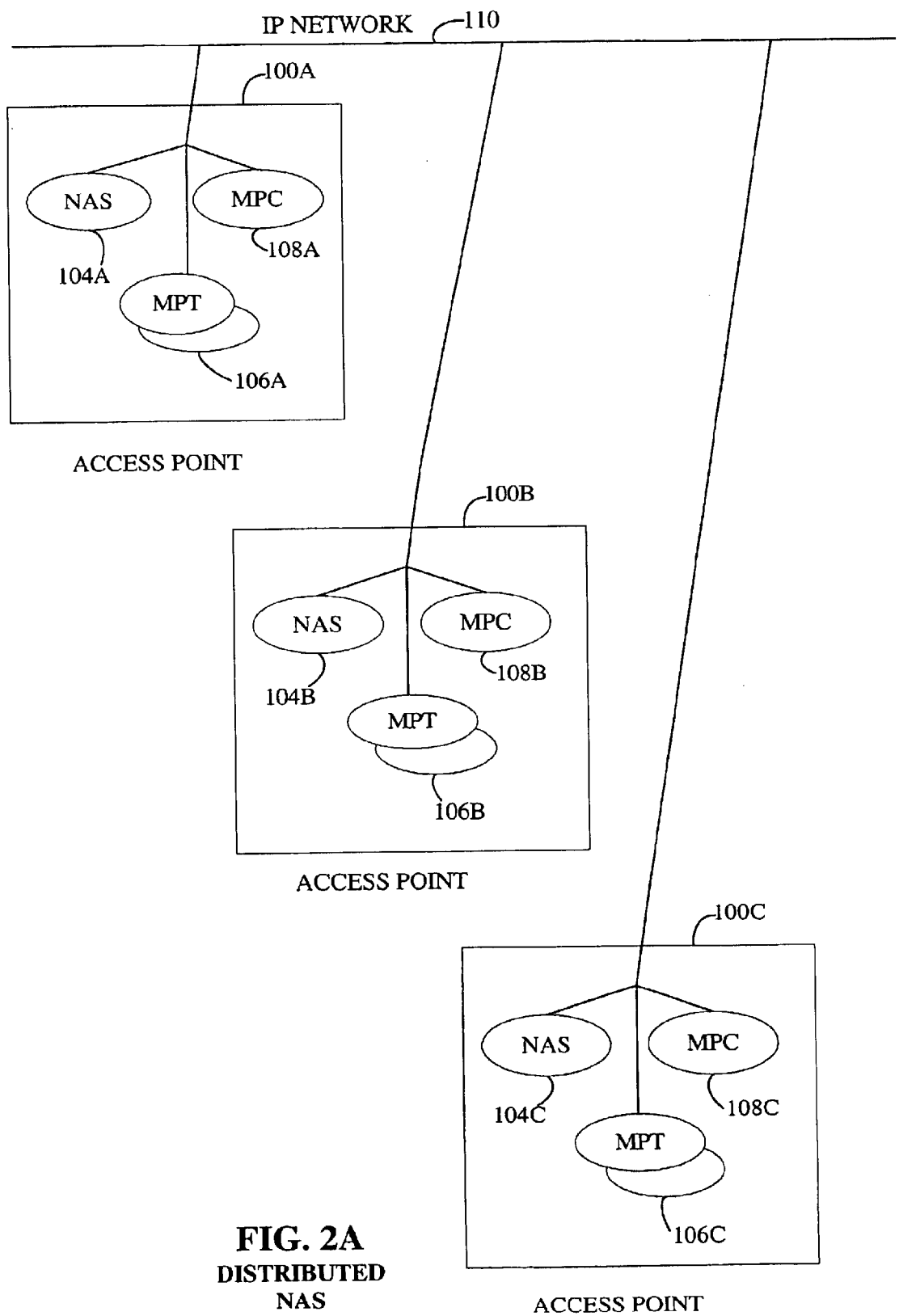
FIG. 2A illustrates a distributed NAS wireless communications network topography.

An exemplary telecommunications network system in which the present invention is embodied is illustrated in FIG. 2A. FIG. 2A illustrates wireless communications network access points 100 connected over an Internet Protocol (IP) Network 110. Access points 100 provide wireless service to subscribers in predefined geographic areas. Sometimes, an access point 100 partitions and independently services portions of the geographic coverage area referred to as sectors. Sectorization of an access point is well known in the art and described in detail in U.S. Pat. No. 5,625,876 entitled "METHOD AND APPARATUS FOR PERFORMING HANDOFF BETWEEN SECTORS OF A COMMON BASE STATION", which is assigned to the assignee of the present invention and incorporated by reference herein. The MPTs 106 covering the same or RF close areas are referred to as the neighbors of an access point. In wireless communication systems, the MPTs 106 for which given MPTs 106 and MPCs 108 require information is determined by the RF propagation characteristics of the signals transmitted by the network access points. In the exemplary embodiment, access point 100 is a topological element of a communications network comprised by a single hardware platform that contains one or more MPTs (MPT) 106, one MPC 108, and one Network Access Server (NAS) 104. Network Access Server 104 is a device which provides access to services on that network in a controlled fashion, based on the identity of the user of the network services in question and on the policy of the provider of these services. The NAS 104 performs traditional network access server protocol functionality, such as defined by Point-to-Point Protocol (PPP) suite, Remote Authentication Dial-In User Server (RADIUS) protocol suite, and the Layer Two Tunneling Protocol (L2TP) suite. MPT 106 contains a bank of traffic channel modems and is responsible for generating the transmitted waveform, and for receiving transmissions from subscribers in the coverage area of an MPT 106. MPT 106 generates and receives waveforms by modulation and demodulation of radio frequency network traffic, and also performs scheduling, power control, and system parameter message handling tasks. MPC 108 is a network element which generates and processes data for the MPTs to transmit and receive. MPCs 108 also provide radio control and signaling services to the MPTs 106 elements such as power control synchronization, maintaining modem session state, and network connection control.

There are two topological Access Network reference models in addition to the traditional wireless network configuration: the distributed MPC; and the distributed NAS.

Figure 1:
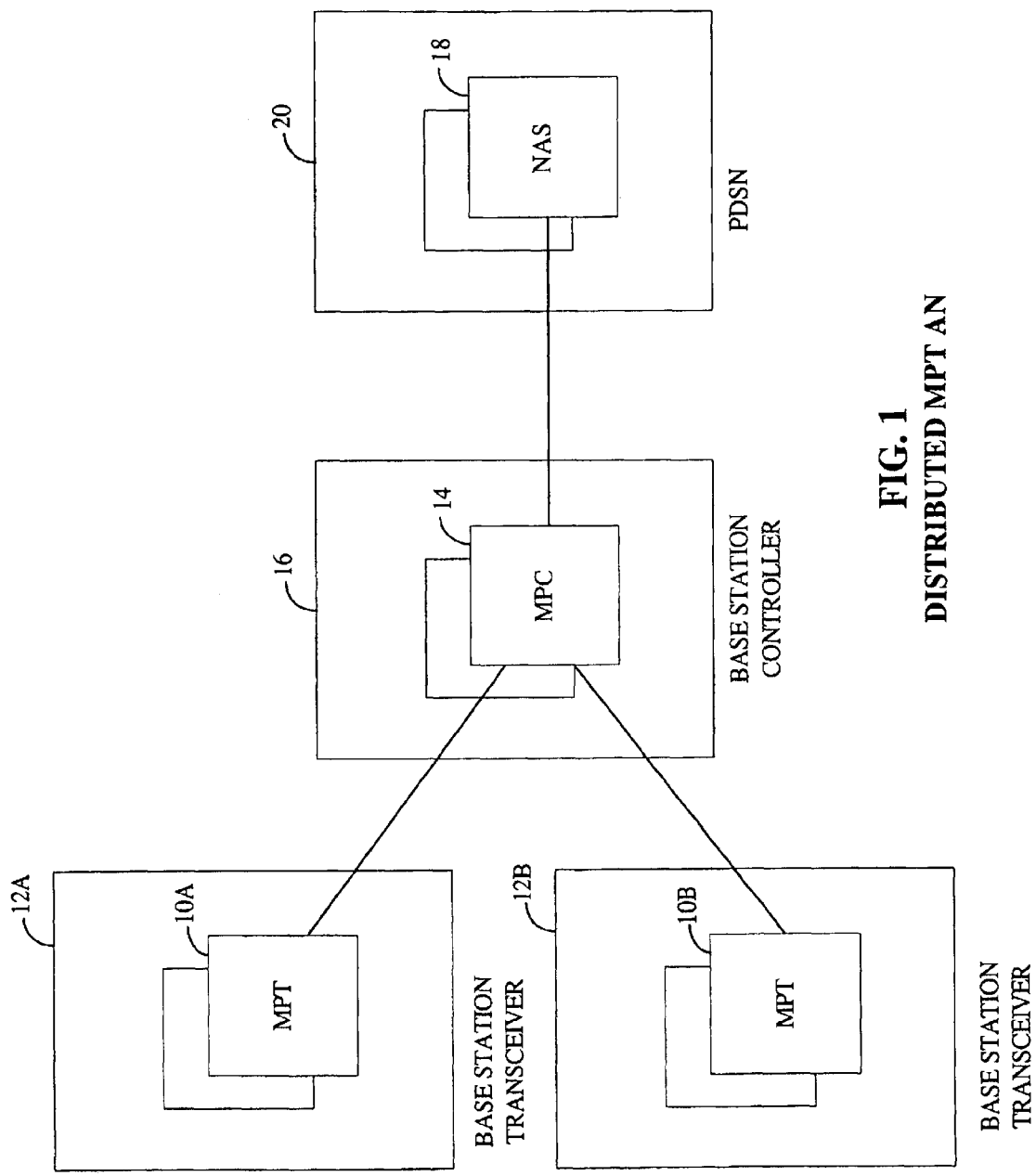
FIG. 1 is a functional block diagram of an exemplary embodiment of the present invention corresponding to a traditional, or distributed MPT, wireless communications network topography.

FIG. 1 is a functional block diagram of an exemplary embodiment of the present invention corresponding to a traditional or distributed MPT 10, wherein wireless communications network topography MPCs 14 are centralized at a point traditionally identified as a Base Station Controller (BSC) 16. NAS 18 functionality is located at a point sometimes known as a Packet Data Servicing Node (PDSN) 20. FIG. 1 shows a distributed MPT Access Network where the MPTs 10 are distributed and the MPCs 14 and NAS 18 are centralized. A distributed MPT Access Point is formed by grouping together one or more co-located MPTs. The Access Network is formed by connecting one or more distributed MPT Access Points, one or more centralized MPCs and one or more centralized Network Access Servers.

FIG. 2A illustrates a distributed NAS wireless communications network topography. In a distributed NAS Access Network, the MPT 106, MPC 108 and NAS 104 are distributed. FIG. 2A shows Access Points 100 formed by grouping together one or more MPTs, one or more MPCs, and one or more Network Access Servers. The Access Network is formed by connecting one or more distributed Access Points.

Figure 2B:
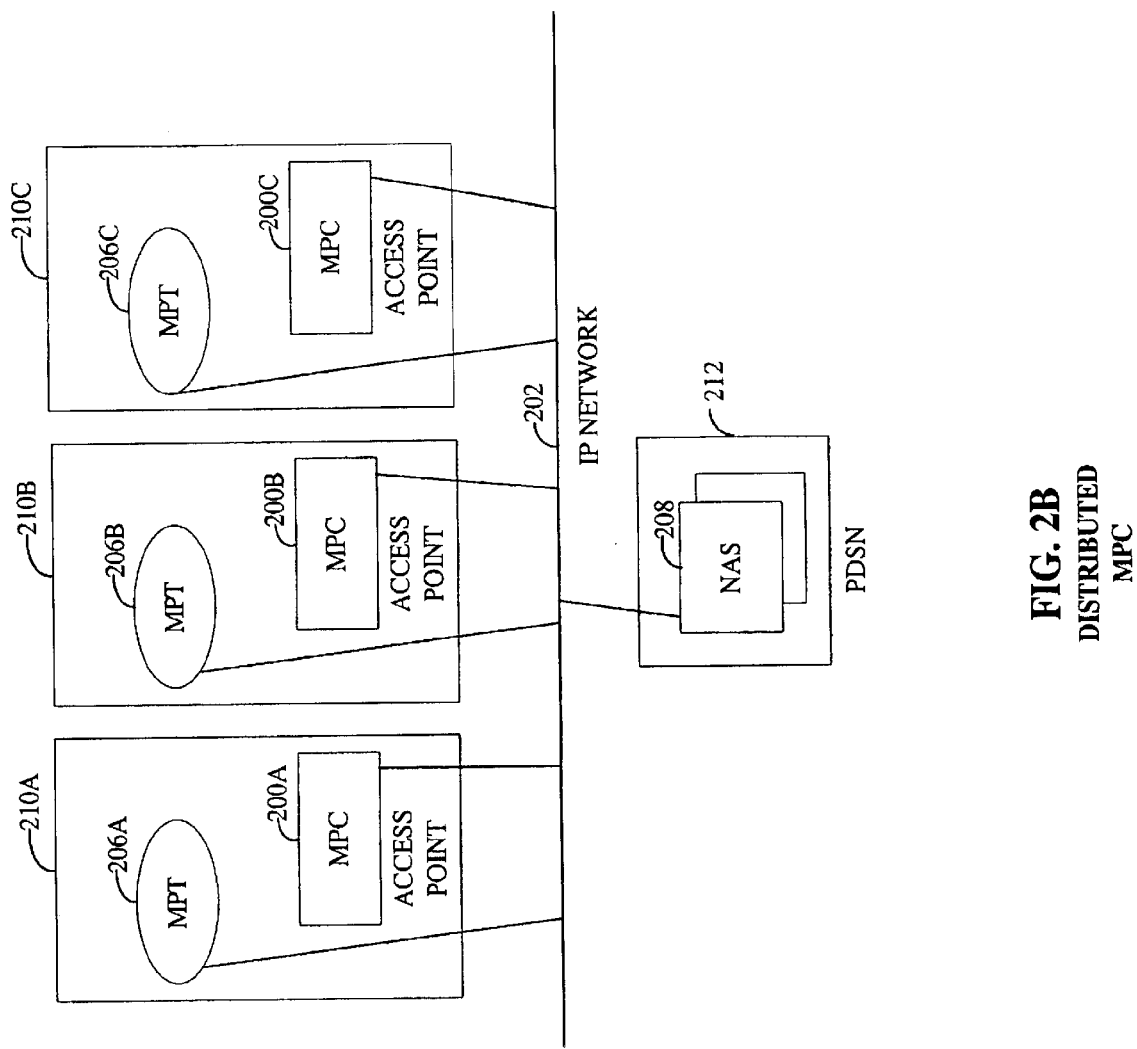
FIG. 2B illustrates a distributed MPC wireless communications network topography.

FIG. 2B illustrates a distributed MPC wireless communications network topography. In a distributed MPC Access Network, the MPT 206 and MPC 200 are distributed and the NAS 208 is centralized, such as within PDSN 212. An Access Point is formed by grouping together one or more MPTs and one or more MPCs. The Access Network is formed by connecting one or more distributed Access Points and one or more centralized Network Access Servers. Again, access point components communicate directly with each other over IP Network 202 using the present invention. In a distributed MPC Access Network, the MPT and MPC are distributed and the NAS is centralized.

In CDMA communications networks, operational and network management parameters must be known in multiple places throughout the system. Although the present invention is described in the context of CDMA communications networks, one skilled in the art will understand that the teachings of the present invention are readily extended to other wireless communication systems such as GSM and AMPS communication networks. These parameters include information contained in operational messages such as Handoff Direction messages, Power Control Parameters messages, Page messages and Neighbor List messages. The contents of these messages is well known in the art and described in detail in Telecommunications Industry Association family of standards IS-95 entitled "MOBILE STATION-BASE STATION COMPATIBILITY STANDARD FOR DUAL-MODE WIDEBAND SPREAD SPECTRUM CELLULAR SYSTEM." These messages are described for illustrative purposes. It will be understood by one skilled in the art that teachings can be extended to other messages necessary to the operation of a wireless communication system. Network configuration parameters must also be known and kept updated in multiple locations. For example, if an MPT 106 is brought on line, brought offline or fails temporarily, other MPTs 106 and MPCs 108 in the system must be informed of the change in resources. The present invention is an improvement over previously known techniques for updating parameters such as propagating required information through the network management interface individually to each network element from a central network manager. Previously known methods require central manager intervention and introduce propagation errors which cause system failures.

The present invention allows wireless CDMA network information propagation to resemble Internet information propagation by dispensing with a centralized manager. The Internet does not have a central manager at the top of the Internet pushing new information down to each router on the Internet each time a router is added to or removed from the Internet. Internet routers know their neighboring routers by address configuration and can query information about them directly by wireline connection. The present invention allows MPT 106 elements to query information about its neighbors by being provided with a list of the Fully Qualified Domain Names (FQDN) of neighboring MPTs 106 and providing a protocol to directly communicate with elements of any other sector without wireline connections. MPCs 108 contain lists of MPTs 106 to which they provide service. Thus, the present invention eliminates the need to propagate redundant information through the network management interface individually to each network element from a central location. The present invention allows MPT 106 and MPC 108 network elements to be added to and removed from a wireless communications network in much the same way a router is added to or removed from the Internet.

The present invention provides a protocol for allowing network entities to retrieve information from a single network entity where the information is most easily configured. The protocol is a simple and flexible method for discovering information and knowing for how long the information is valid. The present invention allows the attributes in one location to propagate directly to other locations where they are needed. Additionally, because most information changes infrequently, the protocol only returns queried information if the information has changed since the last such query.

Figure 3:
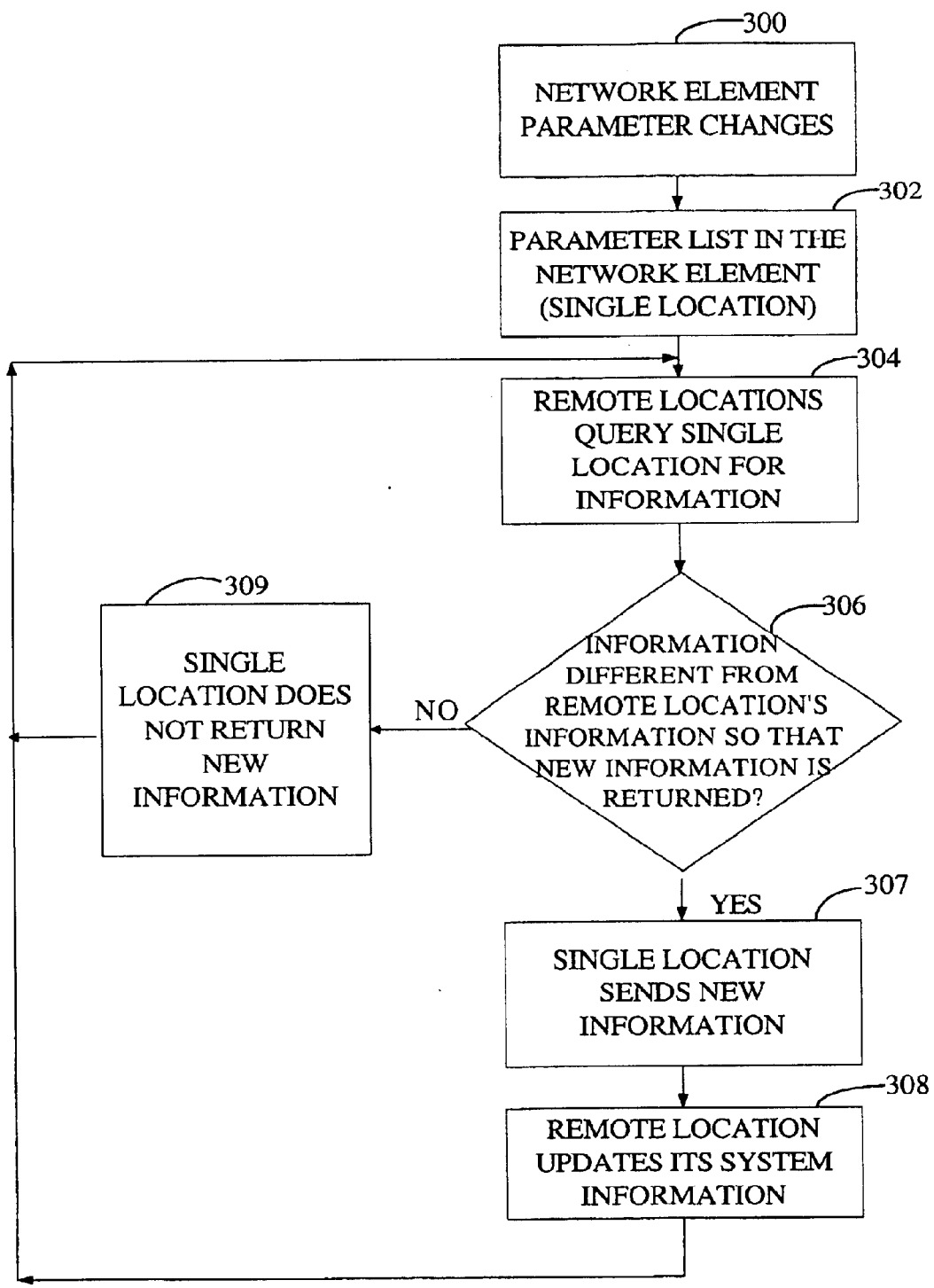
FIG. 3 is a flowchart illustrating the system parameter update mechanism of the present invention.

FIG. 3 illustrates a high level block diagram of the information querying process. In block 300, a parameter of a network element is changed. In block 302, a parameter list contained in the network element is updated to indicate the change. In block 304, a remote network element requests the information in the list. In block 306, the network element containing the list determines if the list has been updated since the last query from the requesting element. If the list has been updated since the last query, the updated list is sent to the querying device in block 307 in response to the request. If, in block 306, the network element containing the list determines that no change has occurred, in block 309 the list is not sent, as the requesting element already has this list. If the list has been sent in block 307, in block 308, the remote network element updates its parameter list accordingly.

Figure 4:
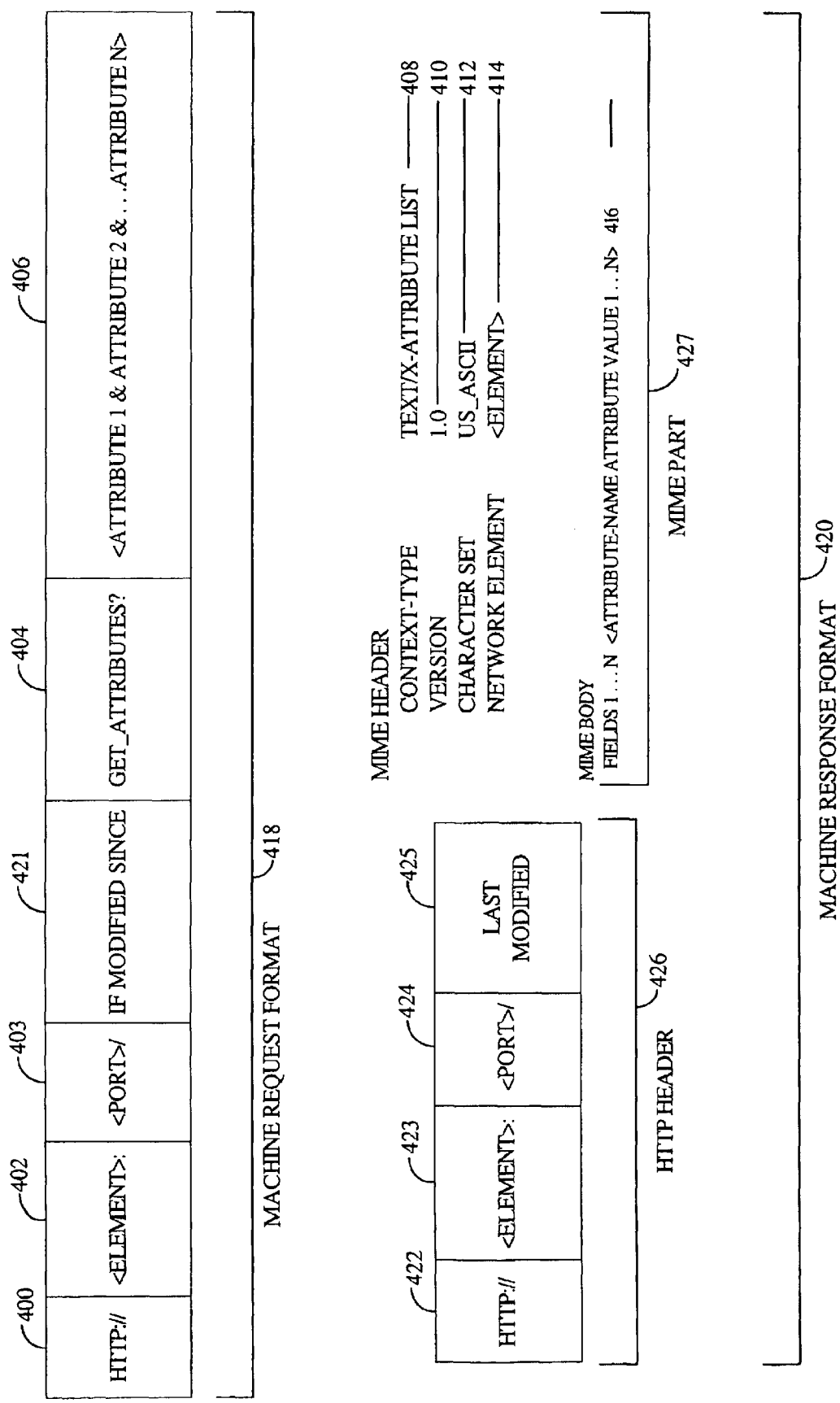
FIG. 4 is a diagram of an exemplary embodiment of the contents of machine requests and machine responses of the present invention.

FIG. 4 illustrates the machine interfaces employed in block 304 to query information from remote locations and in block 308 to send updated information. In the exemplary embodiment, network elements request attribute information through the use of the HyperText Transfer Protocol (HTTP) GET message 418. The elements receive information in an HTTP response 420 which contains HTTP header fields 426 and a Multipurpose Internet Mail Extensions (MIME) part 427. The MIME part 427 is comprised of a MIME header 408–414 and a body containing a list of the requested attribute name/value pairs 416.

To be consistent with the HTTP terminology, the network element using the HTTP GET 418 method to request the attributes will be referred to as the client, and the network element providing the response HTTP header 426 and requested attributes 416 in a MIME part response 427 will be referred to as the server. The exemplary embodiment of the present invention employs the formats described in HTTP version 1.1 and MIME version 1.0. The remote clients may now query the updated information from the server location 304.

The client requests the desired attribute values using the HTTP GET method with the attribute names included in the query field of the absolute Universal Resource Identifier's (URI). In the exemplary embodiment, the URI 418 has the partial form:

"http://<element>:<port>/get_attributes?<attributes>"

wherein element 402 is the Fully Qualified Domain Name of the serving element, port 403 is the port number of the protocol 404, and attributes 406 are the desired attributes separated by "&". The HTTP request header may also contain optional fields described in RFC 2068. The present invention always conditions requests on the optional If Modified Since field 421. The client uses the If Modified Since field 421 to inform the server of when it last updated the information.

The server uses the If Modified Since 421 field of the request 418 to determine if updated information should be sent. If the server has not updated the information since the time specified in the If Modified Since field, the server returns an abbreviated response 420 to the client, containing only HTTP header 426 fields with no MIME part 427 response.

If requested information has been updated since the time specified in the If Modified Since field, thus meeting the If Modified Since 418 condition of the request, the server responds with an HTTP header 426 and a MIME part 427 containing a list of attribute name/value pairs 416 for the requested attributes. The server silently discards any unrecognized attributes. The server includes the Last-Modified field 425 in the response header 426. The server sets the value of the Last-Modified field 425 to the modification time and date of the most recently modified attribute in the response.

The response to the attribute query is carried in version 1.0 of the experimental MIME subtype 408 text/x-attribute-list. This MIME subtype is indicated by the Context-Type field 408. The version parameter 410 indicates the version of the x-attribute-list 408 format. The current value of the version parameter 410 is 1.0. The charset parameter 412 indicates the character set used. In the exemplary embodiment, the only valid value for the character set parameter is "US-ASCII". The <element> parameter 414 indicates the network element type of the server. For example, "modem-pool-transceiver" and "modem-pool-controller" indicate the server is a communications network MPT and a communications network MPC. The body 416 of the MIME part contains zero or more fields. Each field contains the name and value for one attribute.

Some attribute fields 416 are most easily expressed as elements of an array. This MIME part format 427 adopts a uniform method for expressing an array as a set of fields 416. A multi-dimensional array is treated as an array of arrays. Array elements are indexed from 0 using integers. For an attribute array with the attribute-name "X," the number of elements in the attribute array is represented by the attribute-name "X#." For an attribute array with the attribute-name "X", element K of in the attribute array is represented by the attribute-name "X[K]."

If the request contains the attribute name for an attribute array, then the response 420 contains the number of elements in the array and each element in the array, with the number of elements in the array appearing before any of the elements in the array.

Some attributes, such as attributes representing characteristics of a MPT neighbor, are most easily expressed as part of a hierarchy. This MIME part format 427 adopts a uniform method for expressing an attribute in a hierarchy as a field. When an attribute within a hierarchy is converted to a field, it is converted to the attribute-name "Y.X", where "X" is the name of the attribute and Y is the attribute-name of the parent of the attribute. Examples of expressing arrays and hierarchies are described in FIG. 8 and FIG. 9.

Network elements make all of their attributes available through the query protocol of the present invention.

Figure 5:
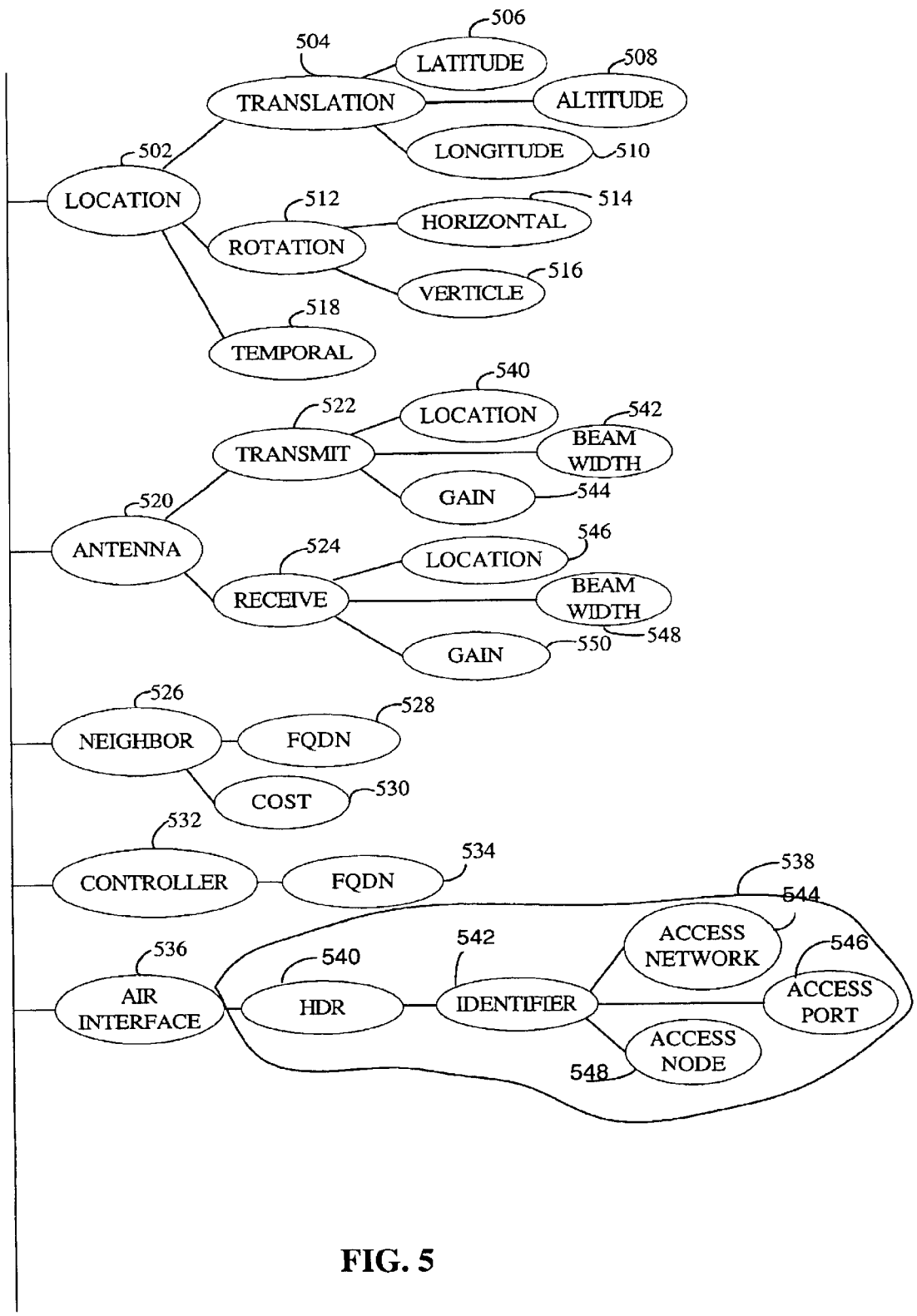
FIG. 5 is a data structure diagram illustrating the data hierarchy of the present invention.

FIG. 5 is a data tree diagram of an exemplary embodiment of a partial data hierarchy of the present invention, illustrating the MPT data structure. It will be understood by one skilled in the art that the hierarchy is presented for illustrative purposes and does not include all attributes necessary. In addition, other structures may be employed and are within the scope of the presentation.

Location 502 is the hierarchical root of all attributes that specify the MPT's location.

Translation 504 is the hierarchical root of all attributes that specify the MPT's location. Latitude 506 specifies the MPT's latitude. The latitude is expressed in degrees, minutes and seconds, with a positive number signifies the Northern Hemisphere. The latitude ranges from −90 degrees to +90 degrees. Longitude 510 specifies the MPT's longitude. The longitude is expressed in degrees, minutes and seconds, with a positive number signifying east longitude. The longitude ranges from −180 degrees to +180 degrees. Altitude 508 specifies the MPT's altitude. The altitude is expressed in meters, with a positive number indicating above sea level altitude.

Rotation 512 is the hierarchical root of all attributes that specify the MPT's orientation to the Earth. Horizontal 514 specifies the MPT's horizontal orientation relative to due east. The horizontal orientation is expressed in degrees, minutes and seconds, with a positive number signifying the Northern Hemisphere. Vertical 516 specifies the MPT's relative vertical orientation. The vertical orientation is expressed in degrees, minutes and seconds. The vertical orientation ranges from −90 degrees to +90 degrees.

Temporal 518 specifies the MPT's local time offset relative to Universal Coordinated Time (UTC). The local time offset is expressed in hours, minutes and seconds. The local time offset ranges from −12 hours to +12 hours.

Antenna 520 is the hierarchical root of all attributes that specify the characteristics of the MPT's antennas. Transmit 522 is an array of the hierarchical root of all attributes that specify the characteristics of the MPT's transmit antennas. Location 540 is the hierarchical root of all the attributes that specify the location of the transmit antenna relative to the location specified in Location 502. Beamwidth 542 is the beam width of the transmit antenna. The beam width is expressed in degrees. The beam width ranges from 0 to 360 degrees. Gain 544 is the gain of the transmit antenna. The transmit antenna gain is expressed in decibels. The gain ranges from 0 to 100 decibels.

Receive 524 is an array of the hierarchical root of all attributes that specify the characteristics of the MPT's receive antennas. Location 546 is the hierarchical root of all the attributes that specify the location of the receive antenna relative to the location specified in Location 502. Beamwidth 548 is the beam width of the receive antenna. The beam width is expressed in degrees. The beam width ranges from 0 to 360 degrees. Gain 550 is the gain of the receive antenna. The receive antenna gain is expressed in decibels. The gain ranges from 0 to 100 decibels.

Neighbor 526 is an array of the hierarchical root of all attributes that specify characteristics, of the MPT's neighbors. FQDN 528 contains the Fully Qualified Domain Name (FQDN) of the neighbor. Cost 530 contains the cost of using the neighbor. The lower the cost, the more likely an AT communicating with the MPT is to see this MPT neighbor. The cost is useful pruning neighbor lists that are too large.

Controller 532 is an array containing each of the MPCs from which the MPT receives service. FQDN 534 contains the Fully Qualified Domain Name of the controller.

Air Interface 536 is the hierarchical root of all of the wireless communications network's air interface attributes. The Air Interface 536 root is extensible to any air interface protocol. HDR Air Interface Protocol 538 is an example of the extensibility of the Air Interface 536 hierarchical root. HDR 540 is a proposed air interface for providing high rate digital data. The HDR air interface is described in detail in U.S. patent application Ser. No. 08/963,386 entitled "METHOD AND APPARATUS FOR HIGHER RATE PACKET DATA TRANSMISSIONS", filed Nov. 3, 1997, now U.S. Pat. No. 6,574,211, issued Jun. 3, 2003 to Padovani et al., assigned to the assignee of the present invention and incorporated by reference herein. Other potential air interface extensions may include but are not limited to GSM, IS-95, cdma2000, and WCDMA. The HDR air interface 538 is defined by a root HDR 540, including an identifier 542, Access Network 544, Access Port 546, and Access Node 548.

Figure 6:
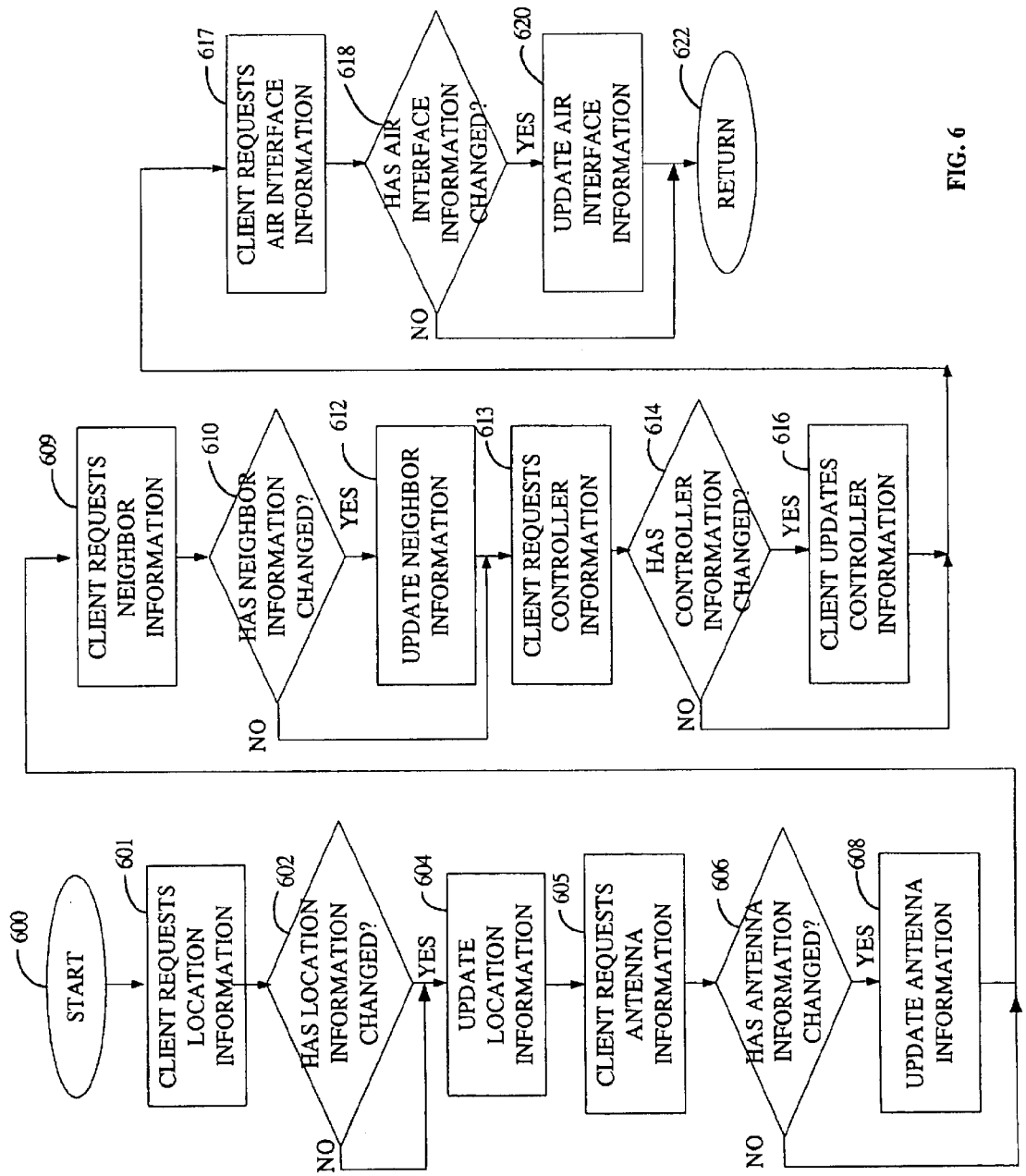
FIG. 6 is an intermediate level flowchart presenting an overview of the system parameter update mechanism.

FIG. 6 is a flowchart of an exemplary embodiment of an intermediate level overview of the present invention's system parameter query and update mechanism. One skilled in the art will understand that ordering of steps illustrated in FIG. 6 is not limiting. Moreover, the requests for information will logically be integrated as will the responses, and it is contemplated that typically only a subset of the information will be integrated information the requests and responses. Typically, requests will be made in a compound request for complex collections of attributes, not serially for single attributes, as shown for simplicity. FIG. 6 is an overview of the information exchanged in the exemplary embodiment of the present invention. The information query process starts in block 600, when a client desires to update information regarding a server. In the exemplary embodiment, the client is updating information regarding the attributes that specify the MPT characteristics of the server.

In block 601, the client conditionally requests Location information 502. A detailed flowchart of the Location attribute request method is provided in FIG. 7. In block 602, the server determines if the requested Location information has changed in the server since the time specified in the If Modified Since field for this information from this client, as conditioned by the If Modified Since 421 field of the request 418; the server sends the new Location attribute information in block 604; and the process moves to block 605. If the requested information has not changed, the server sends header fields 426, but does not send a MIME part 427 with new Location attribute information, and the process moves directly to block 605. If new attribute information has been sent in block 604, the client updates the Location attribute information accordingly.

In block 605, the client conditionally requests Antenna information 520. A detailed flowchart of the Antenna attribute request method is provided in FIG. 8. In block 606, the server determines if the requested Antenna information has changed in the server since the time specified in the If Modified Since field for this information from this client, as conditioned by the If Modified Since 421 field of the request 418; the server returns sends the new Antenna attribute information in block 608; and the process moves to block 609. If the requested information has not changed, the server sends header fields 426, but does not send a MIME part 427 with new antenna attribute information, and the process moves directly to block 609. If new attribute information has been sent in block 608, the client updates the Antenna attribute information accordingly.

In block 609, the client conditionally requests Neighbor information 526. A detailed flowchart of the Neighbor attribute request method is provided in FIG. 9. In block 610, the server determines if the requested Neighbor information has changed in the server since the time specified in the If Modified Since field for this information from this client, as conditioned by the If Modified Since 421 field of the request 418; the server sends the new Neighbor attribute information in block 612; and the process moves to block 613. If the requested information has not changed, the server sends header fields 426, but does not send a MIME part 427 with new Neighbor attribute information, and the process moves directly to block 613. If new attribute information has been sent in block 612, the client updates its Neighbor attribute information accordingly.

In block 613, the client conditionally requests Controller information 532. A detailed flowchart of the Controller attribute request method is provided in FIG. 10. In block 614, the server determines if the requested Controller information has changed in the server since the time specified in the If Modified Since field for this information from this client, as conditioned by the If Modified Since 421 field of the request 418; the server returns sends the new Controller attribute information in block 616; and the process moves to block 617. If the requested information has not changed, the server sends header fields 426, but does not send a MIME part 427 with new Controller attribute information, and the process moves directly to block 617. If new attribute information has been sent in block 616, the client updates its Controller attribute information accordingly.

In block 617, the client conditionally requests Air Interface information 536. In block 618, the server determines if the requested Air Interface information has changed in the server since the time specified in the If Modified Since field for this information from this client, as conditioned by the If Modified Since 421 field of the request 418; the server sends the new Air Interface attribute information in block 620 and the process moves to block 622. If the requested information has not changed, the server sends header fields 426, but does not send new Air Interface attribute information and the process moves directly to block 622. If new attribute information has been sent in block 620, the client updates its Air Interface attribute information accordingly.

Figure 7:
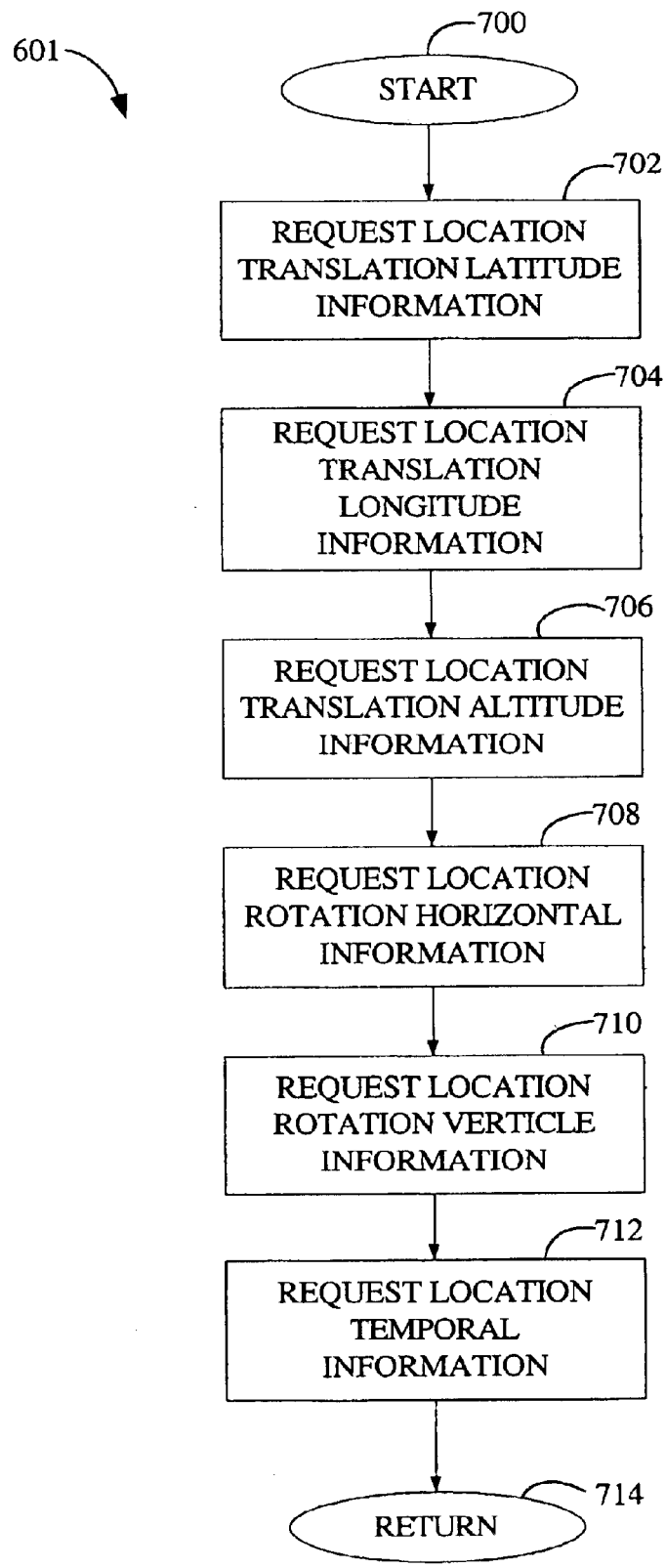
FIG. 7 is a flowchart illustrating the location update procedure of the present invention.

FIG. 7 is a flowchart of an exemplary embodiment of the system parameter update method for the Location attributes 502 that specify the location of MPT type network elements. Location, attribute 502 is the hierarchical root of all attributes that specify the MPT's location. FIG. 7. provides a detailed flowchart of the Location attribute request 601. MPT location information query process starts in block 700, when a client desires to update location information of a neighboring MPT server on the wireless communications network.

In block 702, the client requests latitude information. Translation attribute 504 is the hierarchical data structure root of all the attributes that describe an MPT's physical location on the earth. Latitude attribute 506 specifies the MPT's latitude expressed in degrees, minutes and seconds, with a positive number signifying the Northern Hemisphere. In block 702, the client requests Latitude information 506 from, for example, the MPT 0000.mpt.an.net on protocol port 10 by issuing the following URI conditioned on the If Modified since 418 field:

"http://0000.mpt.an.net:10/get_attributes?Location.Translation.Latitude"

onto the network. The server responds with a header containing a Context-Type 408 of text/x-attribute-list, a version 410 of 1.0, a charset 412 value of US-ASCII, and an element type 414 value of modem-pool-transceiver. If the requested latitude information has changed in the server since the time specified in the If Modified Since field for this information from this client, the server sends a Last Modified field and the new Latitude attribute information in the MIME part response 427 containing the name attribute name-value field of a Location.Translation.Latitude value expressed as +|−dd.mm.ss.f. The latitude ranges from −90 degrees to +90 degrees.

In block 704, the client requests location translation longitude information. The Longitude attribute 510 specifies the MPT's longitude expressed in degrees, minutes and seconds, with a positive number signifying east longitude. In block 704, the client requests Longitude information 510 from the example MPT by issuing the following URI conditioned on the If Modified since 418 field:

"http://0000.mpt.an.net:10/get_attributes?Location?Translation.Longitude"

onto the network. The server responds with a header containing a Context-Type 408 of text/x-attribute-list, a version 410 of 1.0, a charset 412 value of US-ASCII, and an element type 414 value of modem-pool-transceiver. If the requested longitude information has changed in the server since the time specified in the If Modified Since field for this information from this client, the server returns a Last Modified field and the new Longitude attribute information in the MIME part response 427 containing the name-attribute name-value field of a Location.Translation.Longitude value expressed as +|−dd.mm.ss.f. The longitude ranges from −180 degrees to +180 degrees.

In block 706, the client requests location translation altitude information. Altitude attribute 508 specifies the MPT's altitude expressed in meters, with a positive number indicating above sea level altitude. In block 706, the client requests Altitude information 508 from the example MPT by issuing the following URI conditioned on the If Modified since 418 field:

"http://0000.mpt.an.net:10/get_attributes?Location.Translation.Altitude"

onto the network. The server responds with a header containing a Context-Type 408 of text/x-attribute-list, a version 410 of 1.0, a charset 412 value of US-ASCII, and an element type 414 value of modem-pool-transceiver. If the requested altitude information has changed in the server since the time specified in the If Modified Since field for this information from this client, the server returns sends a Last Modified field and the new Altitude attribute information in the MIME part response 427 containing the name-attribute name-value field of a Location.Translation.Altitude value expressed as +|−m.f.

In block 708, the client requests horizontal orientation information. Rotation attribute 512 is the hierarchical data structure root of all the attributes that describe a MPT's orientation to the earth. Horizontal attribute 514 specifies the MPT's horizontal orientation relative to due east. The horizontal orientation is expressed in degrees, minutes and seconds, with a positive number signifying the Northern Hemisphere. In block 708, the client requests Horizontal 514 information from the example MPT 0000.mpt.an.net on protocol port 10 by issuing the following URI conditioned on the If Modified since 418 field:

"0000.mpt.an.net:10/get_attributes?Location.Rotation.Horizontal"

onto the network. The server returns a header containing a Context-Type 408 of text/x-attribute-list, a version 410 of 1.0, a charset 412 value of us-ascii, and an element type 414 value of modem-pool-transceiver. If the requested horizontal orientation information has changed in the server since the time specified in the If Modified Since field for this information from this client, the server returns a Last Modified field and the new Horizontal attribute information 514 in the MIME part response 427 containing the name-attribute name-value field of a Location.Rotation.Horizontal value expressed as +|−dd.mm.ss.f.

The horizontal orientation ranges from −180 degrees to +180 degrees.

In block 710, the client requests vertical orientation information. Vertical attribute 516 specifies the MPT's vertical orientation relative to a line drawn perpendicular from the center of the earth. The vertical orientation is expressed in degrees, minutes and, seconds. In block 710, the client requests Vertical information 516 from the example MPT by issuing the following URI conditioned on the If Modified since 418 field:

"http://0000.mpt.an.net:10/get_attributes?Location.Rotation.Verticle"

onto the network. The server responds with a header containing a Context-Type 408 of text/x-attribute-list, a version 410 of 1.0, a charset 412 value of US-ASCII, and an element type 414 value of modem-pool-transceiver. If the requested vertical orientation information has changed in the server since the time specified in the If Modified Since field for this information from this client, the server sends a Last Modified field and the new Vertical 516 attribute information in the MIME part response 427 containing the name-attribute name-value field of a Location.Rotation.Horizontal value expressed as +|−dd.mm.ss.f. The vertical orientation ranges from −90 to +90 degrees.

In block 712, the client requests location temporal information. The Temporal attribute 518 is the hierarchical data structure root of all the attributes that describe a MPT's time offset. The Temporal attribute 518 specifies the MPT's local time offset relative to Universal Coordinated Time (LTC). The local time offset is expressed in hours, minutes and seconds, with a positive number signifying an added time difference from UTC. In block 712, the client requests Temporal information 518 from the example MPT by issuing the following URI conditioned on the If Modified since 418 field:

"http://0000.mpt.an.net:10/get_attributes?Location.Temporal"

onto the network. The server responds with a header containing a Context-Type 408 of text/x-attribute-list, a version 410 of 1.0, a charset 412 value of us-ascii, and an element type 414 value of modem-pool-transceiver. If the requested temporal information has changed in the server since the time specified in the If Modified Since field for this information from this client, the server sends a Last Modified field and the new Temporal attribute information in the MIME part response 427 containing the name-attribute name-value field of a Location.Temporal value expressed as +|−hh.mm.ss.f. The local time offset ranges from −12 hours to +12 hours.

Location information 502 requests terminate, in block 714, when the client has finished requesting location information.

Figure 8:
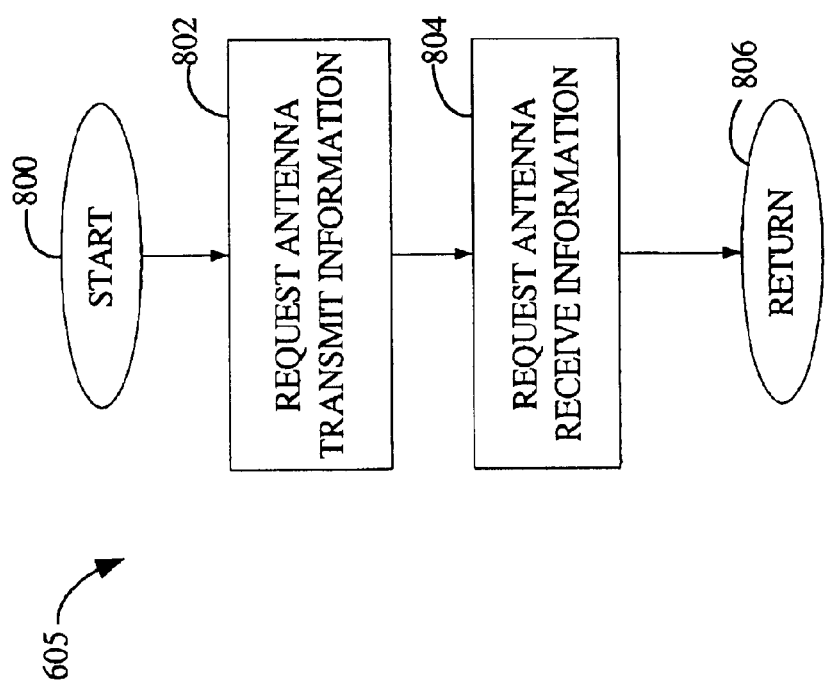
FIG. 8 is a flowchart illustrating the antenna attribute update procedure of the present invention.

FIG. 8 is a flowchart of an exemplary embodiment of the present invention's system parameter update method for all of the Antenna attributes 520 that specify the characteristics of the MPT's antennas. FIG. 8. provides a detailed flowchart of the Antenna attribute request 605. An MPT antenna information query process starts, in block 800, when a client desires to update antenna information from a MPT server of the wireless communications network.

In block 802, the client requests antenna transmit information. The Antenna attribute 520 is the hierarchical data structure root of all the attributes that describe the characteristics of the MPT's antenna or set of antennas. The Transmit attribute 522 is an array of the hierarchical root of all attributes that specify the characteristics of the MPT's transmit antennas. Location 540 is the hierarchical root of all the attributes that specify the location of the transmit antenna relative to the location specified in Location 502. Beamwidth 542 is the beam width of the transmit antenna. The beam width is expressed in degrees. Gain 544 is the gain of the transmit antenna. The transmit antenna gain is expressed in decibels.

Some attributes, such as a MPT Transmit 522, are most easily expressed as an element of an array. This MIME part format adopts a uniform method for expressing an array as a set of fields. A multi-dimensional array is treated as an array of arrays. Array elements are indexed from 0 using integers. For an attribute array with the attribute-name "X", the number of elements in the attribute array is represented by the attribute-name "X#". For an attribute array with the attribute-name "X", element K of in the attribute array is represented by the attribute-name "X[K]".

If the request contains the attribute name for an attribute array, then the response 420 contains the number of elements in the array and each element in the array, with the number of elements in the array appearing before any of the elements in the array.

In block 802, the client requests Transmit array information 522 from the example MPT with 1 transmit antenna by issuing the following URL conditioned on the If Modified since 418 field:

"http://0000.mpt.an.net:10/get_
attributes?Antenna.Transmit.Gain&Antenna.Transmit.Beamwidth"

onto the network. The server responds with a header containing a Context-Type 408 of text/x-attribute-list, a version 410 of 1.0, a charset 412 value of US-ASCII, and an element type 414 value of modem-pool-transceiver. If the requested information has changed in the server since the time specified in the If Modified Since field for this information from this client, the server sends a Last Modified field and the new Antenna Transmit array attribute information in the MIME part response 427 containing the number of elements in the example Antenna.Transmit array expressed as, Antenna.Transmit#1, the gain of the transmit antenna expressed as Antenna.Transmit[0].Gain:d.f the beam width of the transmit antenna expressed as Antenna.Transmit[0]. Beamwidth:d.f, The beam width ranges from 0 to 360 degrees. The gain ranges from 0 to 100 decibels.

In block 804, the client requests receive antenna information. The Antenna Receive attribute 524 is an array of the hierarchical data structure root of all the attributes that specify the characteristics of the MPT's receive antenna or set of receive antennas. Location 546 is the hierarchical root of all the attributes that specify the location of the receive antenna relative to the location specified in Location 502. Beamwidth 548 is the beam width of the receive antenna. The beam width ranges from 0 to 360 degrees. Gain 550 is the gain of the receive antenna. The receive antenna gain is expressed in decibels In block 804, the client requests Receive antenna array information 524 from an antenna MPT with one receive antenna by issuing the following URI conditioned on the If Modified since 418 field:

"http://0000.mpt.an.net:10/get_
attributes?Antenna.Receive.Gain&Antenna.Receive.Beamwidth"

onto the network. The server responds with a header containing a Context-Type 408 of text/x-attribute-list, a version 410 of 1.0, a charset 412 value of US-ASCII, and an element type 414 value of modem-pool-transceiver. If the requested information has changed in the server since the time specified in the If Modified Since field for this information from this client, the server returns a Last Modified field and the new Antenna Receive array attribute information in the MIME part response 427 containing the number of elements in the example Antenna.Receive array expressed as Antenna.Receive#:1 the gain of the receive antenna expressed as

Antenna.Receive[0]. Gain:d.f the beam width of the receive antenna expressed as

Antenna.Receive[0]. Beamwidth:d.f,

The beam width ranges from 0 to 360 degrees. The gain ranges from 0 to 100 decibels.

Antenna information 520 requests terminate, in block 806, when the client has finished requesting antenna information.

Figure 9:
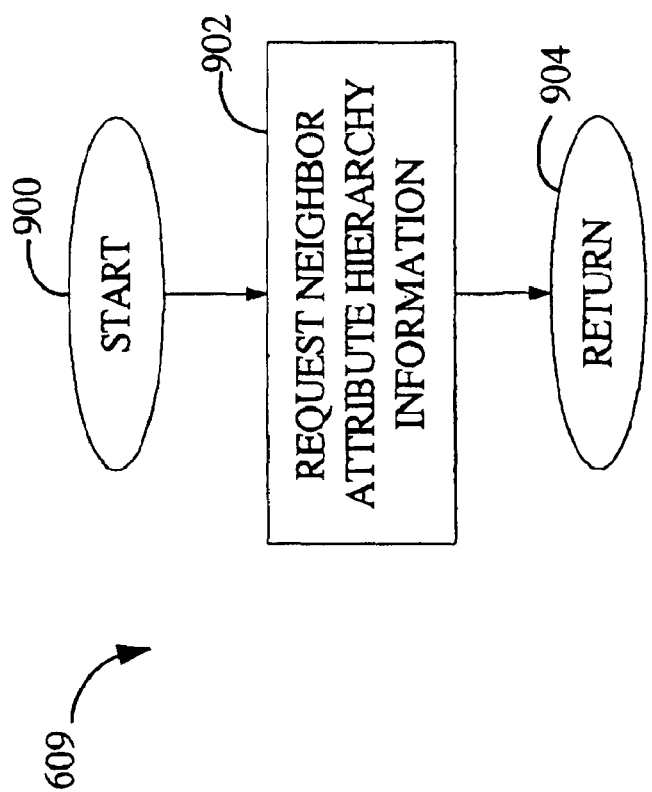
FIG. 9 is a flowchart illustrating the MPT neighbor update procedure of the present invention.

FIG. 9 is a flowchart of an exemplary of the Neighbor attributes 526 which specify the characteristics of MPT's neighbors. FIG. 9. provides a detailed flowchart of the Neighbor attribute request 609. A MPT neighbor information query process starts, in block 900, when a client desires to update neighbor information from a MPT server on the wireless communications network.

In block 902, the client requests neighbor information. Neighbor attribute 526 is an array of the hierarchical root of all attributes that specify characteristics of the MPT's neighbors. Neighbor attribute 526 includes FQDN information and Cost information. FQDN attribute 528 contains the Fully Qualified Domain Name (FQDN) of the neighbor. Cost attribute 530 contains information about use of the neighbor.

Some attributes, such as attributes representing characteristics of an MPT 106 neighbor, are most easily expressed as part of a hierarchy. This MIME type adopts a uniform method for expressing an attribute in a hierarchy as a field. When an attribute within a hierarchy is converted to a field, it is converted to the attribute-name "Y.X", where "X" is the name of the attribute and Y is the attribute-name of the parent of the attribute.

Neighbor attribute 526 information is both an array and a hierarchy. In block 902, the client requests Neighbor attribute 526 from an example hierarchy. The example hierarchy contains a wireless communications network 110 with one MPC 108 and three MPTs 106. The MPC 108 has the FQDN "0000.mpc.an.net". The MPTs 106, in the example, have the FDQNs "0000.mpt.an.net", "0001.mpt.an.net" and "0002.mpt.an.net". Each MPT 106, is a neighbor of the other two MPTs 106 and has no routing cost.

The MPT 106 stores neighbor attributes in the array Neighbor attribute 526. The information stored includes the neighbor's FQDN attribute 528, and the neighbor's Cost attribute 530, corresponding to routing cost.

In block 902, the MPC client 0000.mpc.an.net requests all information about all neighbors of MPT 0000.mpt.an.net by issuing the following URL conditioned on the If Modified since 418 field:

"http://0000.mpt.an.net:10/get_attributes?Neighbor"

onto the network. The server responds with a header containing a Context-Type 408 of text/x-attribute-list, a version 410 of 1.0, a charset 412 value of US-ASCII, and an element type 414 value of modem-pool-transceiver. If the requested information has changed in the servers since the time specified in the If Modified Since field for this information from this client, the servers responds with a Last Modified field and all the new Neighbor array hierarchy information in the MIME part response 427. Additionally, the body 416 contains the name-attribute name-value fields for the number of neighbors the controller has in the example array expressed as Neighbor#:2 the FQDN of the first neighbor expressed as

Neighbor[0].FQDN:0001.mpt.an.net the cost of the first neighbor expressed as

Neighbor[0].Cost:0 the FQDN of the second neighbor expressed as

Neighbor[1].FQDN:0002.mpt.an.net, and the cost of the second neighbor expressed as Neighbor[1].Cost: 0

Neighbor attribute 526 information requests terminate, in block 904, when the client has finished requesting neighbor hierarchy information.

Figure 10:
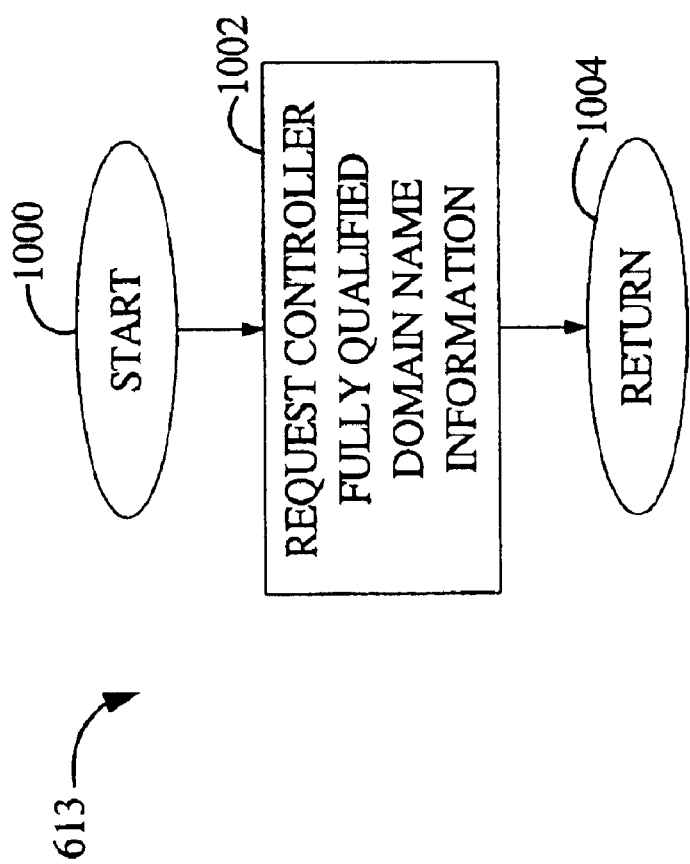
FIG. 10 is a flowchart illustrating the MPC update procedure of the present invention.

FIG. 10 is a flowchart of an exemplary embodiment of the present invention's system parameter update procedure for the attributes that specify the MPC network types from which the MPT network types receive service. FIG. 10. provides a detailed flowchart of the Controller attribute 613 request. A controller information query process starts, in block 1000, when a client desires to update controller information from which a MPT server can receive service.

In block 1002, the client requests controller information. The Controller attribute 532 is the hierarchical data structure root of the FQDN attributes 534, corresponding to the MPCs an MPT can use.

In block 1002, the client requests the FQDN attribute 534, for example from an MPT with 1 MPC. In block 1002, the client issues the following URL conditioned on the If Modified since 418 field:

"http://0000.mpt.an.net:10/get_attributes?Controller"

onto the network. The server responds with a header containing a Context-Type 408 of text/x-attribute-list, a version 410 of 1.0, a charset 412 value of US-ASCII, and an element type 414 value of modem-pool-transceiver. If the requested information has changed in the server since the time specified in the If Modified Since field for this information from this client, the server sends a Last Modified and the new Controller array attribute information in the MIME part response 427 containing the number of elements in the example Controller array expressed as Controller#:1, and the domain name expressed as Controller[0].FQDN: 0001.mpc.an.net.

Figure 11:
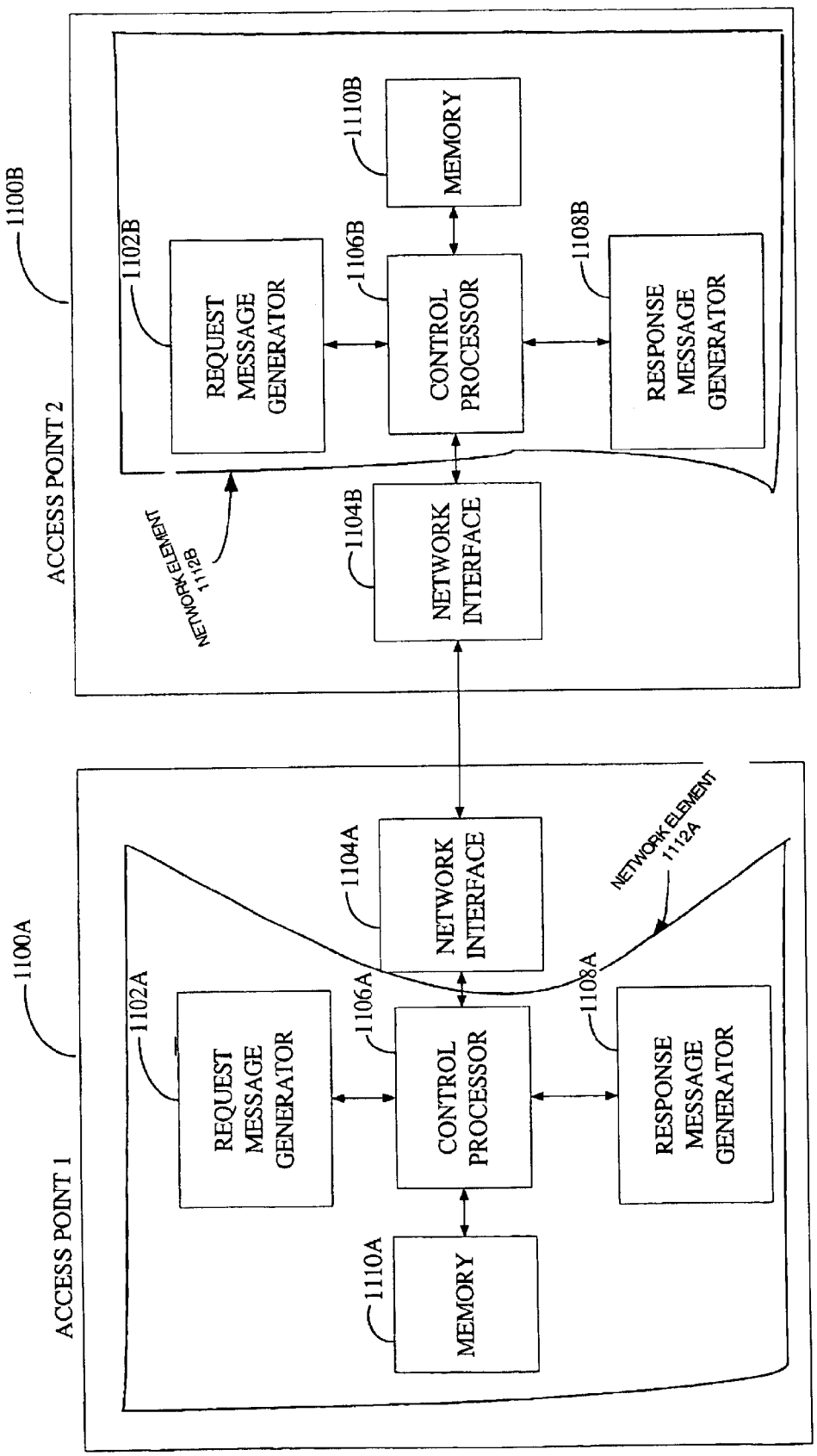
FIG. 11 is a block diagram illustrating the apparatus used to perform the attribute querying operation of the present invention.

FIG. 11 is a block diagram illustrating the apparatus used to perform the attribute querying operation of the present invention. Access point 1100A consists of network element 1112A and a network interface 1104A, such as an EP router. Network Interface 1104A is a device that determines the next network point to which a data packet should be forwarded towards its destination, and connects a network element to an IP network over a variety of bearer services. Network element 1112A can be MPT (10, 106 or 206), MPC (14, 108 or 200) or network access server (18, 104 or 208). For illustrative purposes only the portion of the network elements that are germane to the attribute querying operation are illustrated in network element 1112A.

Network element 1112A includes a memory device 1110A which stores the attributes of access point 1110A wherein the attributes includes a list of FQDNs of other network elements to be queried by the network element 1112A. Control processor 1106A receives a signal from request message generator 1102A indicative of a need for information from another network element. Control processor 1106A retrieves a FQDN from memory element 1110A in response to the signal from request message generator 1102A and in conjunction with this signal and the FQDN generates a query message. Control processor 1106A provides the message to network interface 1104A which routes the message to the appropriate network element 1106B. Network interface 1104B directs the request message to network element 1112B. The request message is provided to control processor 1106B. In response to the request message, control processor 1106B retrieves information regarding the requested attributes from memory 1110B. Response message generator 1108B provides message packaging information to control processor 1106B. Control processor 1106B, in response to the information from memory 1110B and response generator 1108B, generates a response message which it provides to network interface 1104B. Network interface 1104B directs the response message to control processor 1106A in access point 1100A.

If the attribute information in the response message from element 1100B is new, then control processor 1106A updates the information in memory element 1110A. It will be understood by one skilled in the art that the reciprocal operation of querying can be performed from network element 1112B to network element 1112A by simply reversing the A's and B's.

Figure 12:
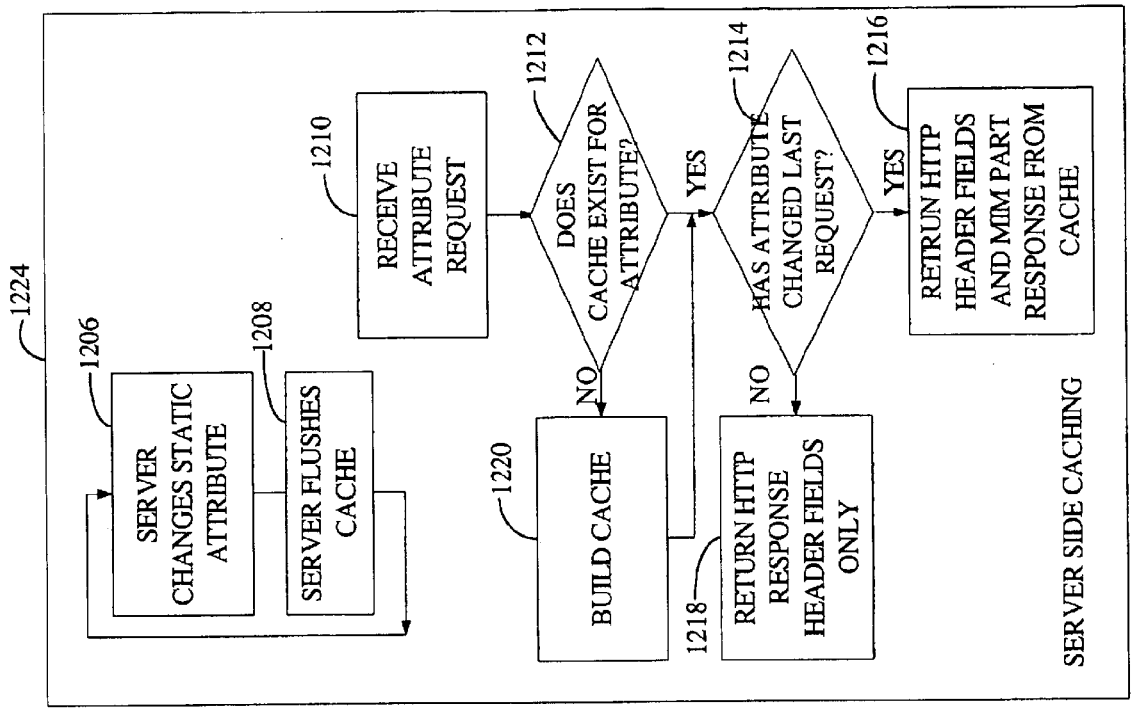
FIG. 12 is a flowchart illustrating the information caching method of the present invention.
Figure 12:
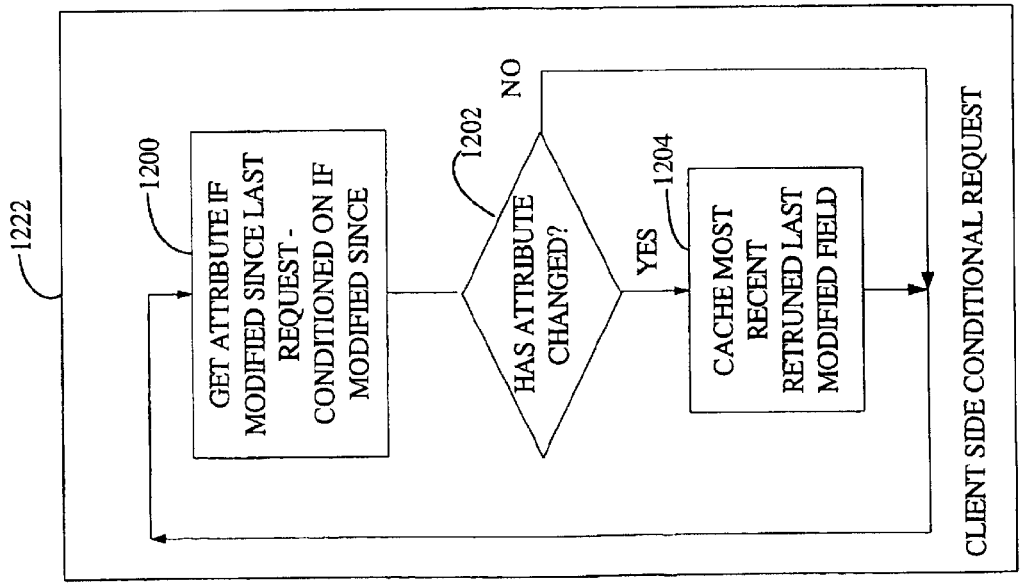

FIG. 12 is a flowchart of an exemplary embodiment of the present invention's method for requesting and cashing attribute information to reduce processing and network traffic. The client request and server caching method illustrated in FIG. 12 allows the client to request the server only send information if the information has changed, and prevents the server from repeatedly generating and returning the same response.

Block 1222, illustrates the client side conditional request. In HTTP, the GET method can be conditioned on several different criteria. This allows the client to request that the server only send information if the information has changed. Of particular use in this query protocol is the If-Modified-Since condition. Use of the If-Modified-Since condition reduces network traffic and client processing. In block 1200 the client uses a GET method conditioned on the If-Modified-Since field to request attribute information. In block 1202, the client determines if the server has responded with updated MIME part 427 attribute information. If the server responds with updated MIME part 427 information, in block 1204, the client caches the most recent Last-Modified field 425 of the response for each different query to each server for use in future queries. When the client repeats a query to a server, block 1200, the client sets the If-Modified-Since field 421 to the value of the returned Last-Modified field 425.

Block 1224 illustrates the server side caching method of the present invention. In many instances, protocols using this query protocol will use queries that are always the same. In addition, in many instances, protocols using this query protocol will query for attributes that change infrequently, known as static attributes. As a result, current servers repeatedly generate and return the same response. By caching query responses that contain only static attributes, the present invention reduces server processing. In the present invention, the server tags certain attributes as "static." Attributes tagged as "static" should be attributes that change infrequently. For example, attributes that are hard coded (such as protocol revisions) and attributes that only change during network build-out and optimization (such as neighbor, lists) are good candidates for being tagged as "static." On the other hand, attributes that change as a function of loading (such as available bandwidth) are bad candidates for being tagged as "static." In block 1206 the server changes a static attribute. In block 1208, the server flushes all cached responses whenever one of the attributes tagged as "static" is modified. This will flush some cached pages unnecessarily. However, since "static" attributes change infrequently by definition, the impact of the unnecessary cache flushing is minimal. The server ensures that the cache is flushed when any attribute in the query has been modified. The server gets much of the benefits of caching using a simple conservative cache flushing algorithm.

In block 1210, the server receives an attribute query from a client. In block 1212 the server determines if a cache exists for the queried information. If the cache had previously been flushed due to attribute change, the server builds a new cache in block 1220, and control proceeds to block 1214. Otherwise, control proceeds directly to block 1214.

In block 1214, the server determines if the requested information has changed since the last such request using the If Modified Since field 421 of the query. If the information has not changed, only the HTTP response header 426 is returned, as illustrated by block 1218. If the requested information has been modified since the time specified in the If Modified Since field, then in block 1216 the server returns the HTTP response header 426 and the MIME part 427 response from the cache.

Figure 13:
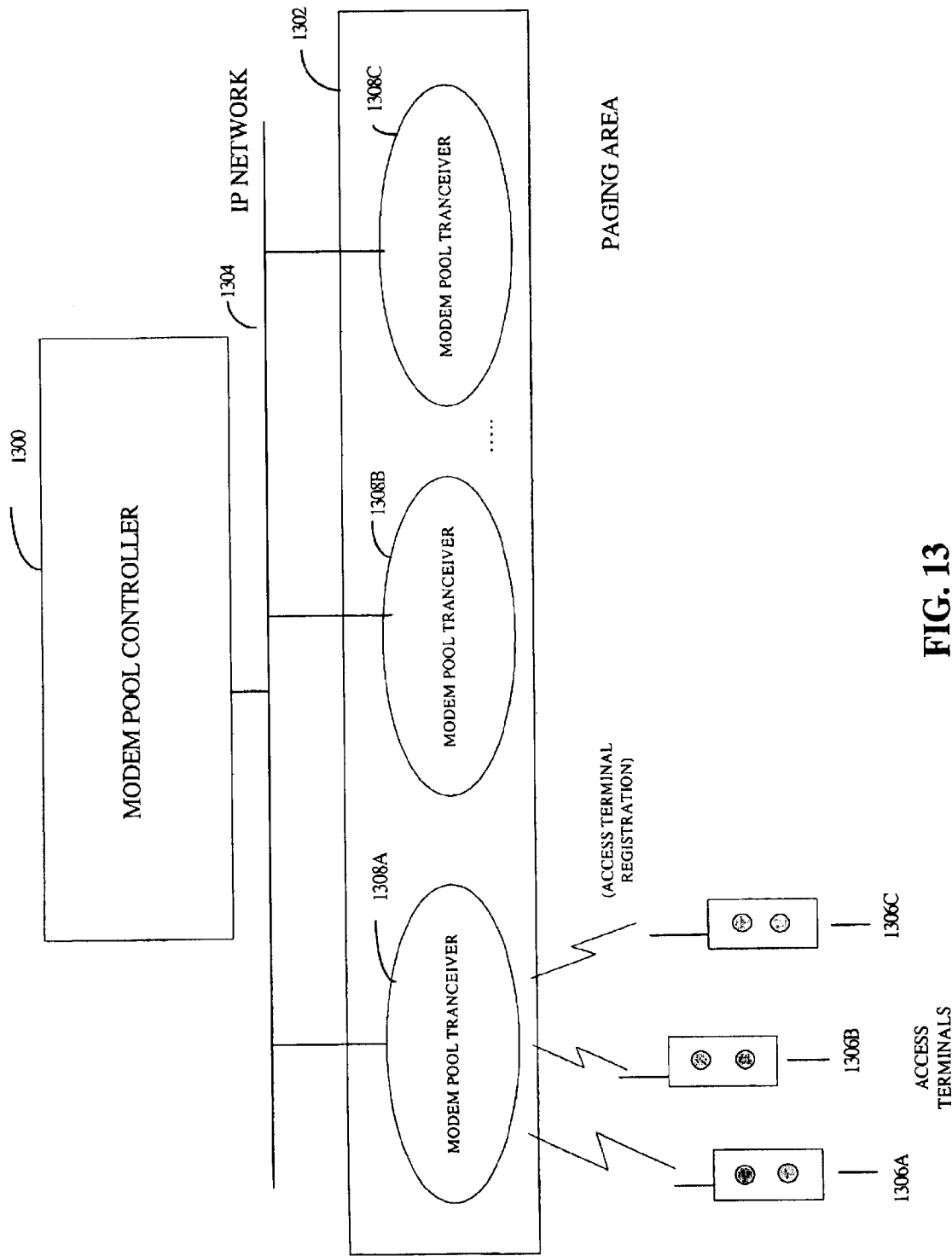
FIG. 13 is a block diagram illustrating the apparatus used to perform Paging Information Discovery in a wireless communications system.

FIG. 13 is a block diagram illustrating the apparatus used to perform Paging Information Discovery with the Access Network Paging Information Protocol. The Access Network Paging Information Protocol allows an MPC 1300 to dynamically determine the paging area 1302 of ATs 1306A, 1306B, 1306C the MPC 1300 controls.

When an AT is dormant, or has an active session and no active connection, the AT 1306 provides the Access Network with regular location updates. There are several triggers that cause an AT 1306 to provide the Access Network with a location update.

MPC element 1300 provides service to a collection of one or more MPT elements 1308 over IP Network 1304. An AT 1306 updates, or registers, its location with MPC 1300 by sending its location information to the MPT 1308 in which it is located. The MPT 1308 forwards the location information to the MPC 1300 over the IP Network 1304. The MPC 1300 locates the AT 1306 by paging AT 1306 in, all the MPTs 1302 in which AT 1306 might be located. The collection of MPTs 1302 where an AT could be located is the AT's paging area 1302.

Figure 14:
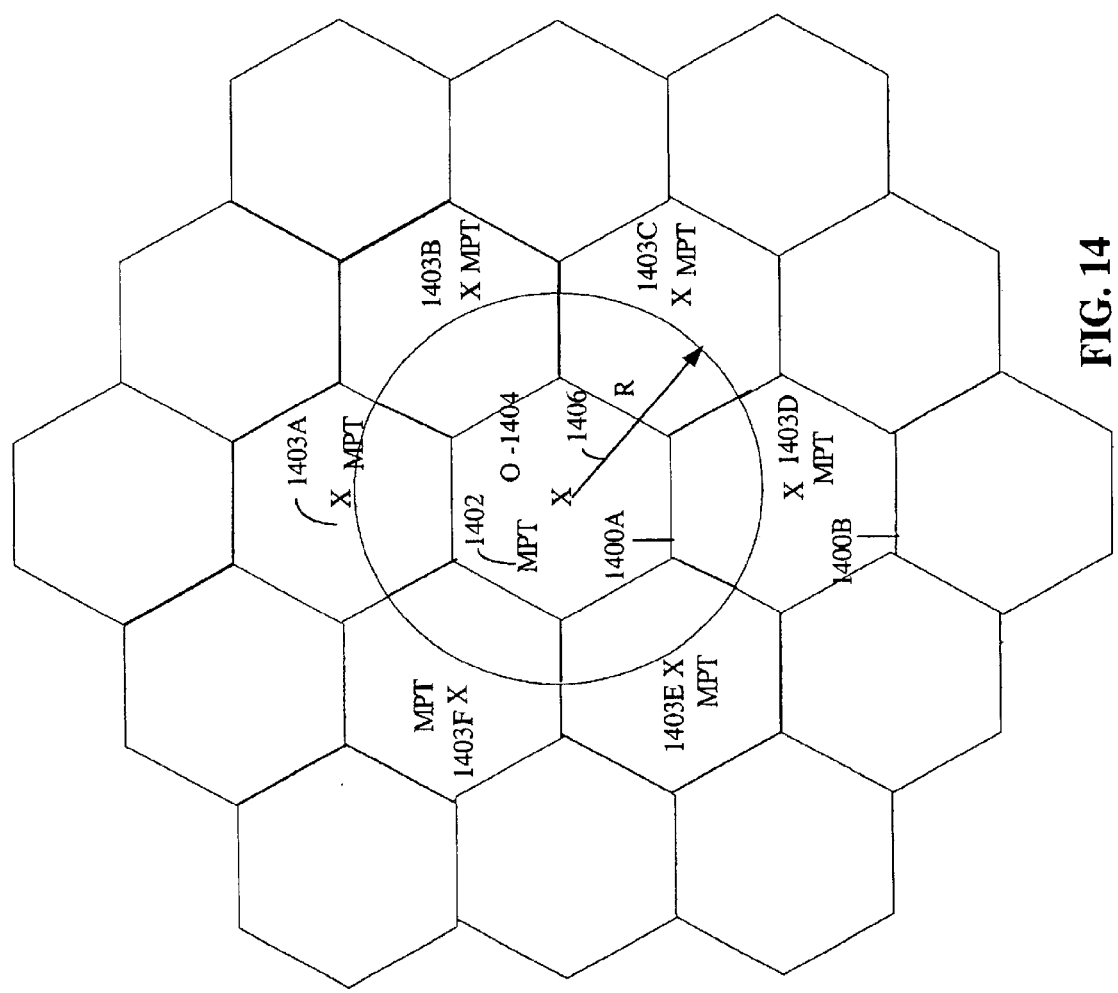
FIG. 14 is an AT Paging Area Diagram.

FIG. 14 illustrates an AT paging area. In one embodiment, a protocol for MPCs to determine paging areas without the intervention of a central network manager is provided. The paging area is determined by AT 1404 location update procedures known as registration. AT 1404 movement through the Access Network may require location registration with MPCs based on different criteria including distance 1406 and zone 1400A, or both, depending on what types of location registration are enabled in the AT 1404. A registration area corresponds to the reported MPT 1402 of the location update, plus all other MPTs to which the AT 1404 could move without registering again because no distance or boundary zone has been crossed. In other words, the registration area is the area in which the AT 1404 can be located without the need to re-register. This area is determined by the registration distance and registration zone. If an AT is within registration distance from the last AT in which the AT registered and is within the same registration zone, then the AT is in the same registration area.

A paging area is a list of MPTs 1402, 1403 in which an AT may be located at any given time. The list comprises the MPTs 1402 located in the registration area of the AT, and all of their neighbors 1403. The neighbors 1403 of the MPTs 1402 in the registration area are included in the paging area to account for the fact that it takes an AT a non-zero time to detect that a location update must be performed, and to perform the location update. In other words, the AT may have crossed into a neighboring MPT before a location update has occurred at the MPC.

If zone-based registration is enabled at the AT 1404, the AT 1404 must perform a location update if the AT 1401 crosses from one zone 1400a to an adjacent zone 1400b. If distance-based registration is enabled at the AT 1404, the AT 1404 must perform a location update if the AT 1404 moves farther than distance R 1406 since its last location update. The paging area created is the MPT 1402 where the AT 1404 last reported itself to be located and one ring of neighboring MPTs 1403 around the MPT 1402.

Paging areas depend on the values of the distance and zone location update triggers. While the values of these triggers can differ between MPTs, they are independent of the AT. Registration distances 1406 and zones 1400 are configured by the service provider operator for each MPT to balance the amount of registration traffic against the amount of paging traffic on the network. The paging discovery protocol and paging area algorithm of the presently described embodiments determine where to page an AT moving through the access network based on the configured information and the last registered location.

Each MPT has its own paging area. A sector may have one or more MPTs. If a sector has more than one MPT, the MPTs are communicating to ATs on different frequencies. A neighboring MPT in an adjacent sector is known as a horizontal neighbor. A neighboring MPT in the same sector operating on a different frequency is known as a vertical neighbor.

Figure 15:
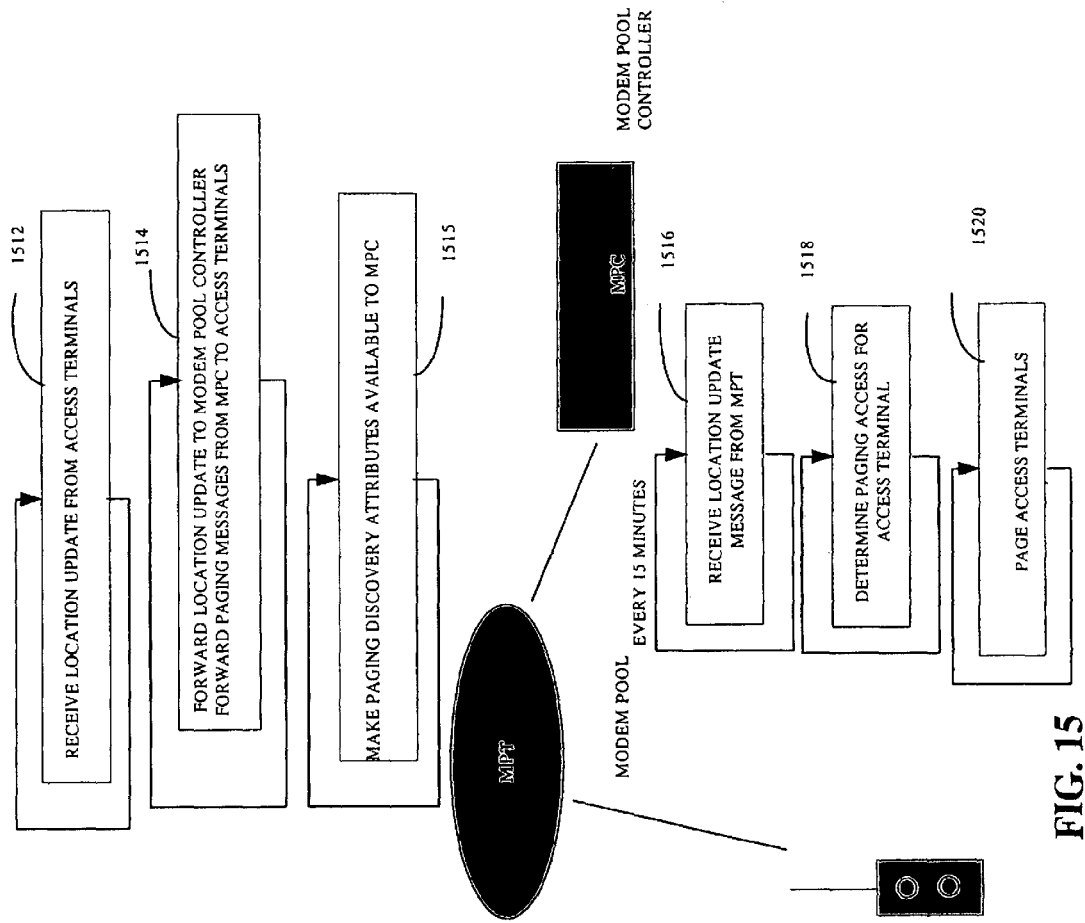
FIG. 15 is a high level diagram of a method used to perform Paging Information Discovery in a wireless communications system.
Figure 15:
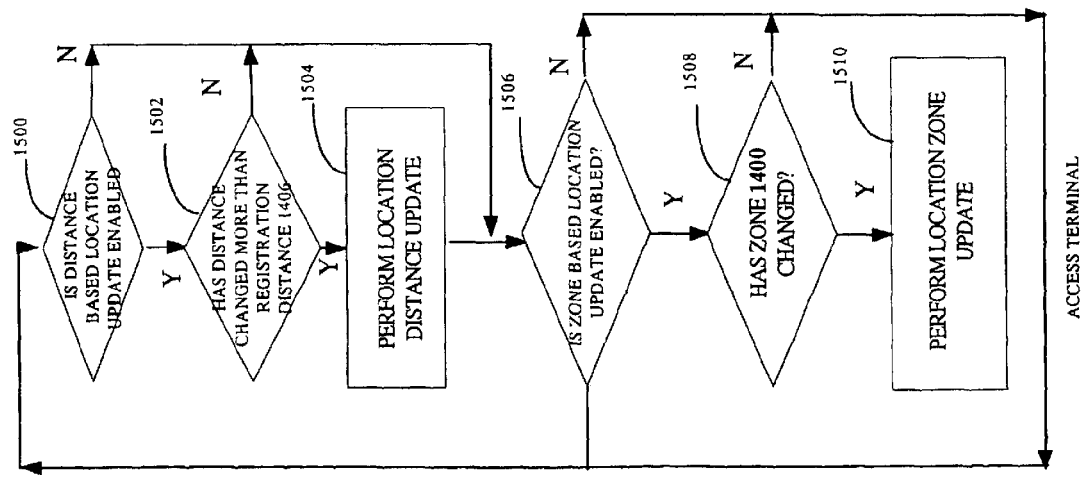

FIG. 15 is a high level block diagram of a method in accordance with one embodiment for performing Paging Information Discovery in a wireless communications system.

Distance and zone update triggers allow the Access Network to reduce the paging area for an AT.

If distance-based location update is enabled, then the AT will perform a location update after moving greater than the location update distance since the AT last performed a location update. If zone-based location update is enabled, then the AT will perform a location update after moving into a location update zone different from the location update zone in which the AT last performed a location update.

Blocks 1500–1510 illustrate the paging functionality of the AT. In block 1500, the AT determines if its distance-based location update is enabled. If distance-based location update is enabled, in block 1502 the AT determines if its distance has changed more than its configured registration distance. Otherwise, control proceeds directly to block 1506. If in block 1502 the AT determined its distance had changed more than the distance trigger, in block 1504 the AT performs a location distance update and control moves to block 1506. If no distance update is necessary in block 1504, control moves to block 1506.

In block 1506, the AT determines if its zone-based location update is enabled. If zone-based location update is enabled, in block 1508 the AT determines if the AT has moved into a location update zone different from the location update zone in which the AT last performed a location update. If zone-based location update is not enabled, AT processing terminates until the next update interval. If in block 1508, the AT determined its zone had changed, in block 1510 the AT performs a location zone update and AT processing terminates until the next update interval. If no zone update is necessary in block 1510, AT processing terminates until the next update interval. Update intervals are determined by a state machine that executes every time the AT moves into the coverage of a new MPT.

When an AT performs a location update, the location update is forwarded to the MPC that is providing the AT service. If the MPC does not provide service to the MPT that received the location update, then one of two things will happen. If the AN does support MPC handoff, then the AT will be handed off to an MPC that does provide service to the MPT that received the location update. If the Access Network does not support MPC handoff, then the session will be terminated and the AT will need to establish a new session. The new session will be established with an MPC that does provide service to the MPT that received the location update. As a result, the number of paging areas that a particular MPC must have knowledge of and maintain information for can be reduced.

Blocks 1512–1514 illustrate the individual paging functionality tasks of the MPT. The MPT receives location updates from ATs in task block 1512. In task block 1514, the MPT forwards the location updates to the MPC servicing the MPT, and forwards paging messages received from the MPC to ATs. The MPT responds to paging discovery attribute queries from the MPC in task block 1515.

Blocks 1516–1520 illustrate the individual paging functionality tasks of the MPC. In task block 1516, the MPC receives AT location updates forwarded by the MPT and uses the information to determine updated paging areas for the AT in task block 1518. The MPC sends paging messages to dormant ATs in task block 1520. The paging area determination and AT paging functionality of the MPC are described in detail with reference to FIG. 17.

Figure 16:
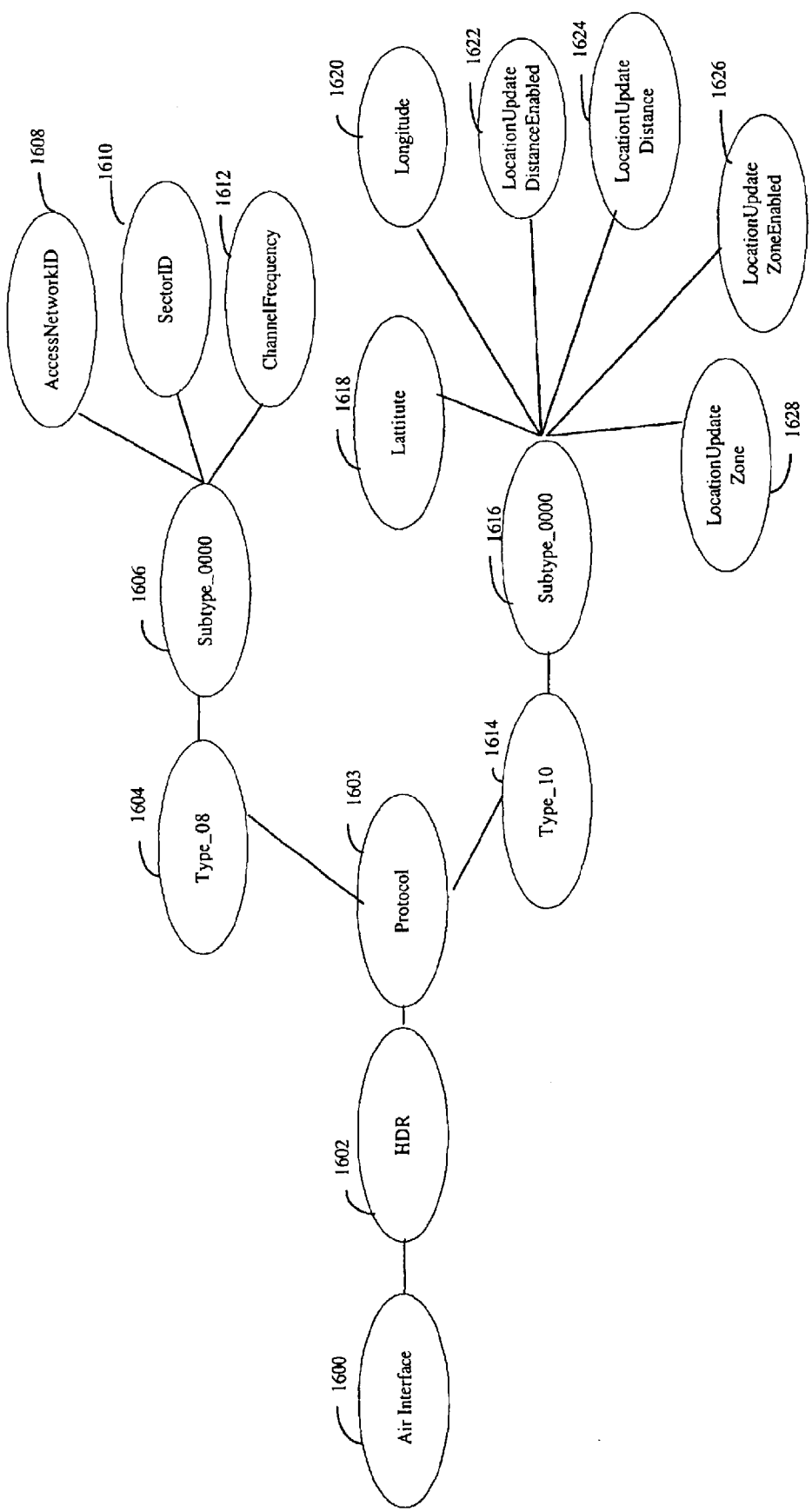
FIG. 16 is a data structure diagram illustrating the data hierarchy of paging information discovery attributes of an embodiment of the present invention.

FIG. 16 is a data tree diagram of an exemplary embodiment of a partial data hierarchy of the present invention, illustrating paging information discovery attributes which are an extension of the Air Interface 536 root. It will be understood by one skilled in the art that the hierarchy is presented for illustrative purposes and does not include all attributes necessary. In addition, other structures may be employed and are within the scope of the presentation.

AirInterface 1600 is the hierarchical root of all air interface attributes.

HDR 1602 is the hierarchical root of all HDR air interface attributes.

Protocol 1603 is the hierarchical root of all HDR air interface attributes organized by protocol type and protocol subtype.

Type_08 1604 is the hierarchical root of all HDR air interface attributes associated with HDR protocol type 8, the Overhead Protocol.

SubType_0000 1606 is the hierarchical root of all HDR air interface attributes associated with HDR protocol type 8, the Route Update Protocol and protocol subtype 0, the Default Overhead Protocol.

AccessNetworkID 1608 specifies the Access Network to which the MPT belongs.

SectorID 1610 specifies the Sector to which the MPT belongs.

ChannelFrequency 1612 specifies the channel frequency of the MPT.

Type_10 1614 is the hierarchical root of all HDR air interface attributes associated with HDR protocol type 10, the Route Update Protocol.

SubType_0000 1616 is the hierarchical root of all HDR air interface attributes associated with HDR protocol type 0x10, the Route Update Protocol and protocol subtype 0, the Default Route Update Protocol.

Latitude 1618 specifies the AT's latitude. This attribute is equivalent to the attribute Location.Translation.Latitude 506.

Longitude 1620 specifies the AT's longitude. This attribute is equivalent to the attribute Location.Translation.Longitude 510.

LocationUpdateDistanceEnabled 1622 is a boolean attribute that indicates whether or not distance-based location update is enabled.

LocationUpdateDistance 1624 is the location update distance.

LocationUpdateZoneEnabled 1626 is a boolean that indicates whether or not zone based location update is enabled.

LocationUpdateZone 1628 is the location update zone.

Figure 17:
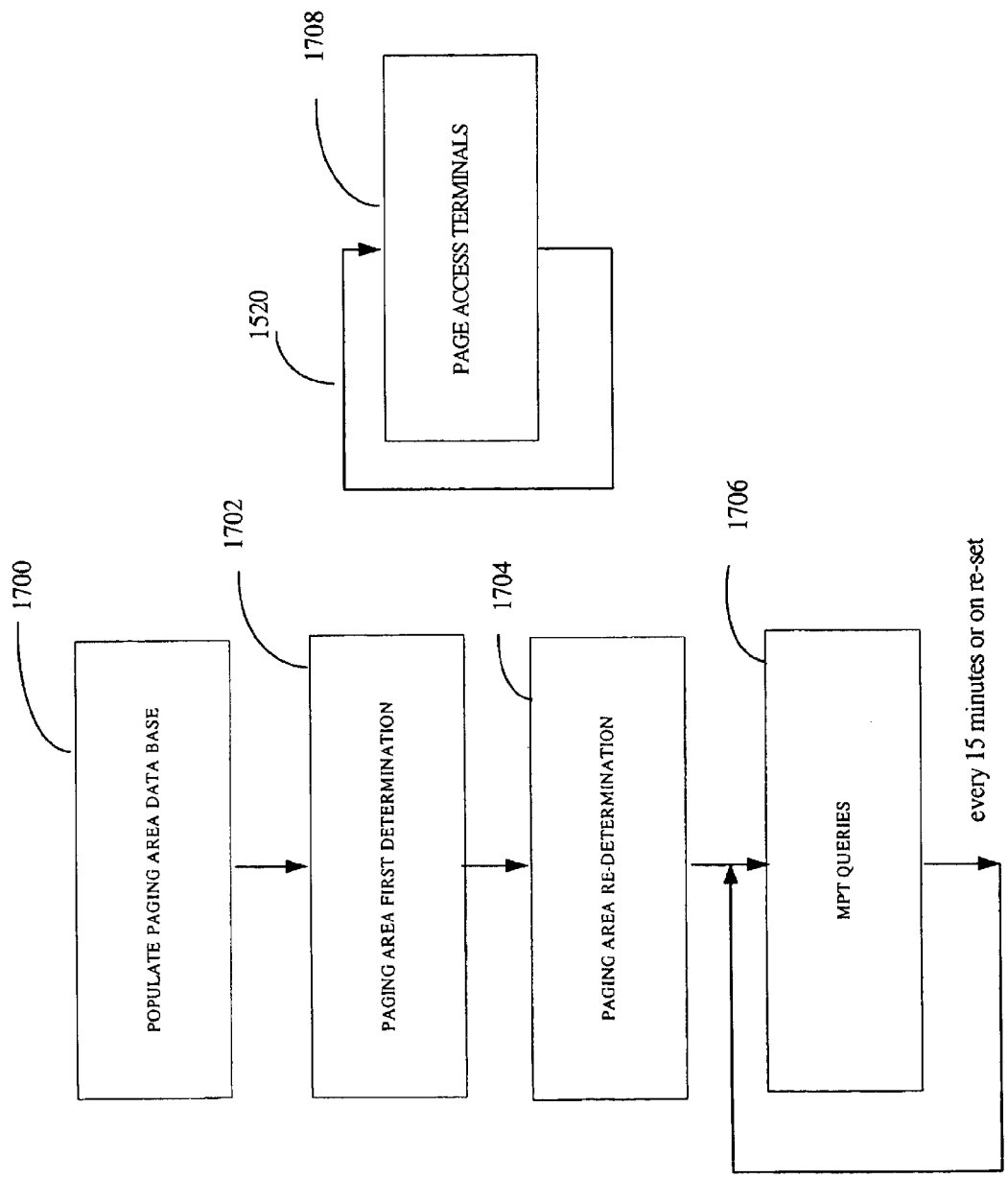
FIG. 17 is a block diagram illustrating a paging area determination method.

FIG. 17 is a block diagram illustrating a paging area determination and AT paging method in accordance with one embodiment.

Paging area determination and AT paging are MPC functions. Each MPC builds a database containing the paging area of each AT to which the MPC is providing service.

A straightforward implementation of the database might have one paging area entry per AT. Since an MPC may serve as many as one thousand ATs per MPT, this implementation could result in a very large database. In addition, since mobile ATs move frequently, this implementation could result in a large number of database updates. However, the present embodiment implements the database in a more efficient way.

Paging areas depend on the values of the distance and zone location update triggers. While the values of these triggers can differ between MPTs, the values are independent of the AT. Therefore, the paging area database of the present embodiment has one paging area entry per MPT rather than one paging area entry per AT. Since multiple ATs are likely to be located in the same MPT, having one entry per MPT reduces the size of the database.

When an AT performs a location update, the location update is forwarded to the MPC that is providing the AT service. If this MPC does not provide service to the MPT that received the location update, the present embodiment will provide one of two responses. If the Access Network does support MPC handoff, then the AT will be handed off to an MPC that does provide service to the MPT that received the location update. If the Access Network does not support MPC handoff, then the session will be terminated and the AT will need to establish a new session. The new session will be established with an MPC that does provide service to the MPT that received the location update. As a result, the present embodiment further simplifies the paging area database.

Since an MPC will either hand off or release ATs that perform location updates in MPTs that the MPC does not serve, the database of the present embodiment need only contain a paging area entry for each MPT to which the database provides service. In the case where the MPCs are located within the Access Points, the database of the present embodiment will contain entries only for MPTs that are in the same Access Point.

The MPC performs initial population of its database in block 1700. In order to populate the paging area database, each MPC uses the algorithm of the present embodiment to determine the paging area for each MPT to which it provides service. The present embodiment discovers paging area changes every twenty minutes by causing the MPC to re-determine the paging area for each MPT to which it provides service every fifteen minutes. In addition, the MPC re-determines the paging area whenever the MPC is reset, such as after a firmware upgrade or a power outage. Finally, the present embodiment allows the MPC to re-determine the paging area on command from the operator.

The first determination of the paging area is performed in block 1702. When first determining, the paging area for an MPT, the MPC does the following.

Starting at the root MPT, the MPC recursively follows the neighbor list until one of the stopping criteria is met. The root MPT is the MPT for which the MPC is determining the paging area. If distance-based location update is enabled on the root MPT, then the recursion stops when the distance between the root MPT and the queried MPT exceeds the location update distance of the root MPT. If zone-based location update is enabled on the root MPT, then the recursion stops when the zone of the queried MPT is different than the zone of the root MPT. The MPT paging area is the list of all MPTs that were queried.

The paging area includes all the MPTs in which an AT would not perform a location update if the AT had performed a location update in the root MPT. In addition, the paging area includes the neighbors of the aforementioned MPTs. The neighbors are included in order to account for the fact that it takes an AT a non-zero time to detect that a location update must be performed and to perform the location update.

The algorithm of the present embodiment prunes the MPTs in which an AT is paged based on location update area. However, the algorithm does not prune MPTs in which an AT is paged based on AT Identifier. An Access Node of the Access Network is a single-coverage, single-frequency point of connection to an Access Network. An Access Node is the basic building block of the Access Network. The Access Node is identified by its sector (SectorId) 1610 and its carrier frequency (ChannelFrequency). A sector of the Access Network is a collection of one or more channels with the same geographical coverage area and SectorID 1610.

When an Access Port contains multiple Access Nodes, a page message for a particular AT need be sent only to the Access Node to which the AT will hash, or successfully match an AT page message address key to the Access Node. Hashing is the transformation of an AT address into a (usually shorter) fixed-length value, or key, that represents the original address. Hashing is used to index and retrieve items in a database because it is faster to find the item using the shorter, hashed key than to find it using the original value.

The algorithm could further reduce the MPT paging list by eliminating all Access Nodes in an Access Port to which the AT will not hash, or achieve an address key match. However, the present embodiment does not reduce the MPT paging list by eliminating all Access Nodes in an Access Port to which the AT will not hash for the following reason. If an Access Node within an Access Port fails, some ATs covered by the Access Port will hash to different Access Nodes. If the Access Node paging list had been pruned to include only the Access Nodes to which the AT had originally hashed, then the Access Node paging list would need to be updated whenever such an Access Node failure occurred. The service outage resulting from such Access Node failures is coupled to the MPT paging list update rate. As a result, pruning the Access Node paging list to include only the Access Nodes to which the AT hashes would undesirably increase the MPT paging list update rate.

After first determining a paging area, the MPC regularly re-determines the paging area in block 1704. Re-determination is the same as first determination 1702, with one exception. In first determination, if a queried MPT does not respond, then the recursion through that MPT stops. However, in re-determination, if a queried MPT does not respond, then the recursion assumes that the configuration is unchanged since the last query and continues. This makes the protocol tolerant of temporary MPT outages. Because the present embodiment is tolerant of outages, lists do not have to be adjusted in every MPT for each occurrence of a temporary outage. The lists dynamically configure themselves, with each cell performing paging information discovery for itself. The present embodiment eliminates the need for paging areas to be reconfigured by a central manager in the event of temporary cell outages. This feature of the present embodiment eliminates paging area information propagation errors and system failures caused by paging failures. Additionally, if carriers change registration distances or zones the lists do not have to be manually changed by a central network manager. Instead, the present embodiment provides a method to automatically update the paging areas using the Paging Information Discovery and Access Network Attribute Query Protocols.

Paging area first determination and re-determination requires the MPC to query MPTs for information illustrated in block 1706. The MPC performs the queries using the Access Network Attribute Query Protocol. The MPC queries the MPT with IF Modified Since conditioned HTTP get requests 418 for the following parameters: "Neighbor-.FQDN" 528, "AirInterface.HDR.Protocol.Type_08.Subtype_0000" 1606, and "AirInterface.HDR.Protocol.Type_10.Subtype_0000" 1616.

The MPC may not need all these attributes from a specific MPT. However, rather than creating different queries for the specific attributes that the MPC needs from each MPT, a single query that is the union of all the attributes is created by the protocol of the present embodiment. This is done so that each MPT will receive the same query from every MPC. Therefore, the MPT will only need to cache one query response. However, the MPC will need to discard the attributes that it does not need.

The MPC uses the attributes "AirInterface.HDR.Protocol.Type_08.Subtype_0000.AccessNetworkID" 1608, "AirInterface.HDR.Protocol.Type_08.Subtype_0000.SectorID" 1610, and "AirInterface.HDR.Protocol.Type_08.Subtype_0000.ChanneFrequency" 1612, from the query response.

If the queried MPT is the root MPT, then the MPC uses the additional attributes, "AirInterface.HDR.Protocol.Type_10.Subtype_0000.Latitude" 1618, "AirInterface.HDR.Protocol.Type_10.Subtype_0000.Longitude" 1620, "AirInterface.HDR.Protocol.Type_10.Subtype_0000.LocationUpdateDistanceEnabled" 1622, "AirInterface.HDR.Protocol.Type_10.Subtype_0000.LocationUpdateDistance" 1624, "AirInterface.HDR.Protocol.Type_10.Subtype_0000.LocationUpdateZoneEhabled" 1626, and "AirInterface.HDR.Protocol.Type_10.Subtype_0000.LocationUpdateZone 1628" from the query response 420.

If distance-based location update is enabled on the root MPT, then the MPC uses the additional attributes "AirInterface.HDR.Protocol.Type_10.Subtype_0000.Latitude" 1618, and "AirInterface.HDR.Protocol.Type_10.Subtype_0000.Longitude" 1620 from the query response 420.

If zone-based location update is enabled on the root MPT, then the MPC uses the additional attribute "AirInterface.HDR.Protocol.Type_10.Subtype_0000.LocationUpdateZone" 1628 from the query response 420.

In block 1708, the MPCs page ATs receiving service from the MPCs using the paging protocol of the present embodiment. When paging an AT, the MPC sends a page message to one or more MPTs.

Each page message transmitted by the MPC includes the identifier for the AT being paged. This allows an MPT to discard page messages based on whether or not the AT will hash to the MPTs Access Nodes.

The MPC sends a copy of the page message to each MPT in the page area. The IP address used by the MPT for its paging resource may be a unicast, multicast or broadcast address.

The IP address of the MPT's paging resource is allowed to be a multicast and broadcast address in order to reduce the number of page message copies that an MPC must send, thus reducing paging traffic on the Access Network.

If either distance-based or zone-based location update is enabled, the paging message includes a unique over-the-air identifier comprising the AccessNetworkID 1608 and SectorId 1610 for each MPT in the paging area. This allows an MPT to discard page messages that the MPT is not responsible for transmitting.

Preferred embodiments of the present invention have thus been shown and described. It would be apparent to one of ordinary skill in the art, however, that numerous alterations may be made to the embodiments herein disclosed without departing from the spirit or scope of the invention. Therefore, the present invention is not to be limited except in accordance with the following claims.

What is claimed is:

1. A method for determining cellular paging areas of a wireless communication network, comprising:
    initially populating a paging area data base by starting at a root MPT;
    sending inquiries, directly to the neighbors of the root MPT, inquiring as to a neighbor list contained in each of the root MPT's neighbors;
    receiving the neighbor list contained in each of the root MPT's neighbors;
    recursively following neighbor lists of the root MPT's neighbors, which respond to the root MPT, in order to initially populate the paging area data base with the neighbors of the root MPT;
    terminating the recursive following of the neighbors lists of the root MPT's neighbors upon satisfaction of a stop criteria; and
    periodically redetermining the paging area.

2. The method of claim 1 further comprising:
    terminating the recursive following of neighbor lists of MPTs, which respond to the root MPT, when distance based location update is enabled on the root MPT and a queried MPT exceeds the location update distance of the root MPT.

3. The method of claim 1 further comprising:
    terminating the recursive following of neighbor lists of MPTs, which respond to the root MPT when zone based location update is enabled on the root MTP and a queried MTP is in a different zone than the root MPT.

4. The method of claim 1 wherein periodically redetermining the paging area includes assuming, if a MPT does not respond, that the configuration is unchanged since the last query.

5. An apparatus for determining cellular paging areas of a wireless communication network, comprising:
    a root MPT having a memory containing a paging area data base;
    a request message generator for sending inquiries, directly to the neighbors of the root MPT, inquiring as to a neighbor list contained in each of the root MPT's neighbors;
    a network interface for receiving neighbor lists contained in each of the root MPT's neighbors;
    a control processor for recursively following neighbor lists of MPTs, which respond to the root MPT, in order to initially populate the paging area data base with the neighbors of the root MPT, and for terminating recursively following neighbor lists of MPT's when a stop criteria is satisfied; and
    a program within the control processor for periodically redetermining the paging area.

6. The apparatus of claim 5 wherein the control processor terminates the recursive following of neighbor lists of MPTs, which respond to the root MPT, when distance based location update is enabled on the root MPT and a queried MPT exceeds the location update distance of the root MPT.

7. The apparatus of claim 5 further comprising wherein the control processor terminates the recursive following of neighbor lists of MPTs, which respond to the root MPT when zone based location update is enabled on the root MPT and a queried MPT is in a different zone than the root MPT.

8. The apparatus of claim 5 wherein the control processor periodically redetermines the paging area and assumes, if a MPT does not respond, that the configuration is unchanged since the last query.

9. An apparatus for determining cellular paging areas of a wireless communication network, comprising:
    means for initially populating a paging area data base by starting at a root MPT;
    means for sending inquiries, directly to the neighbors of the root MPT, inquiring as to a neighbor list contained in each of the root MPT's neighbors;
    means for receiving the neighbor list contained in each of the root MPT's neighbors;
    means for recursively following neighbor lists of the root MPT's neighbors, which respond to the root MPT, in order to initially populate the paging area data base with the neighbors of the root MPT;
    means for terminating the recursive following of the neighbors lists of the root MPT's neighbors upon satisfaction of a stop criteria; and
    means for periodically redetermining the paging area.

10. The apparatus of claim 9 further comprising:
    means for terminating the recursive following of neighbor lists of MPTs, which respond to the root MPT, when distance based location update is enabled on the root MPT and a queried MPT exceeds the location update distance of the root MPT.

11. The apparatus of claim 9 further comprising:
    means for terminating the recursive following of neighbor lists of MPTs, which respond to the root MPT when zone based location update is enabled on the root MPT and a queried MPT is in a different zone than the root MPT.

12. The apparatus of claim 9 wherein means for periodically redetermining the paging area includes assuming, if an MPT does not respond, that the configuration is unchanged since the last query.

* * * * *